US011945127B2

(12) United States Patent
Arndt et al.

(10) Patent No.: US 11,945,127 B2
(45) Date of Patent: Apr. 2, 2024

(54) OUTLINER HAIR TRIMMER WITH INTERCHANGEABLE WORKHEADS

(71) Applicant: WAHL CLIPPER CORPORATION, Sterling, IL (US)

(72) Inventors: Steven Wayne Arndt, Geneseo, IL (US); Edward D. Brill, Sterling, IL (US); Ronaldo J. Santiago, South Elgin, IL (US); Scott W. Beu, Bolingbrook, IL (US); Rick Hering, Bartlett, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 211 days.

(21) Appl. No.: 17/241,895

(22) Filed: Apr. 27, 2021

(65) Prior Publication Data

US 2022/0339807 A1 Oct. 27, 2022

(51) Int. Cl.
*B26B 19/14* (2006.01)

(52) U.S. Cl.
CPC .................................. *B26B 19/148* (2013.01)

(58) Field of Classification Search
CPC ..... B26B 19/148; B26B 19/02; B26B 19/046; B26B 19/048; B26B 19/10; B26B 19/12; B26B 19/38
USPC ....... 30/29.5, 43.7, 43.8, 43.9, 43.91, 43.92, 30/42, 44, 45, 195, 208, 209, 210
See application file for complete search history.

(56) References Cited

U.S. PATENT DOCUMENTS

| | | | | |
|---|---|---|---|---|
| 2,186,122 | A | 1/1940 | Rand, Jr. | |
| 2,336,160 | A * | 12/1943 | Boyd | B26B 19/26 30/29.5 |
| 2,661,531 | A * | 12/1953 | Streng | B26B 19/02 D28/51 |
| 5,568,688 | A | 10/1996 | Andrews | |
| 6,378,210 | B1 * | 4/2002 | Bickford | B26B 19/3813 30/43.92 |
| 8,677,627 | B2 | 3/2014 | Li et al. | |
| 2008/0209733 | A1 * | 9/2008 | Johnson | B26B 21/405 30/526 |
| 2009/0056137 | A1 * | 3/2009 | Royle | B26B 19/06 30/45 |
| 2009/0165303 | A1 | 7/2009 | Burgess et al. | |

FOREIGN PATENT DOCUMENTS

JP 3017142 U 10/1995

OTHER PUBLICATIONS

International Search Report and Written Opinion received for PCT/US22/17726, dated Jul. 12, 2022.

(Continued)

*Primary Examiner* — Phong H Nguyen
(74) *Attorney, Agent, or Firm* — Greer, Burns & Crain, Ltd

(57) ABSTRACT

A hair trimmer is provided, including a trimmer housing having a drive end, a drive shaft projecting from the drive end, a support bracket associated with the drive end, and a cutting workhead connectable to the drive shaft and being supported on the trimmer by the support bracket. The cutting workhead is removable from operational engagement with the trimmer housing without the use of tools.

19 Claims, 18 Drawing Sheets

(56) References Cited

OTHER PUBLICATIONS

Wahl Clipper Corporation, Product Description for "Aqua Blade Rechargeable Wet Dry Lithium Ion Deluxe Trimming Kit with 4 Interchangeable Heads for Shaving, Detailing, & Grooming Beards, Mustaches, Stubble, Ear, Nose, & Body—Model 9899-100," retrieved from http://www.amazon.com on Feb. 25, 2021, 5 pages.

Taotuo, Product Description for "Professional Hair Clippers Trimmer for Men T Blade Trimmer, Pro Li Outline Clippers, Cordless Barber Hair Clipper, Zero Gapped Detail Stainless Blade Bald Head Beard Shaver Barber Shop," Tiupa Pro Li Trimmer, retrieved from http://www.amazon.com on Feb. 25, 2021, 4 pages.

* cited by examiner

OUTLINER HAIR TRIMMER WITH INTERCHANGEABLE WORKHEADS

BACKGROUND

The present invention relates generally to electric hair trimmers, and more specifically to such devices used for achieving precision and detailed trimming styles on the customer's scalp and/or face, or trimming nose and ear hair.

Modern hair grooming is more popular and often features design elements cut into the customer's hair down to the skin. These design elements take a variety of forms including but not limited to well-defined edges for facial hair, geometric designs, freeform patterns, images of animals, text and the like. Also, modern grooming includes maintenance for areas like nose and ear hair. Precision grooming is often challenging to home hair groomers using conventional electric hair trimmers, where it is often difficult to view the cutting blade and area, since traditional hair clippers have housings that extend to the bladeset cutting teeth. As such, the housing often obscures the view of the cutting area to achieve precision.

Hair clipper manufacturers have addressed this need by providing specialized outliner trimmers (in the present application, hair clippers and hair trimmers are collectively referred to as hair trimmers) which have an exposed bladeset positioned axially from an end of the housing for enhancing the hair groomer or stylist's view of the cutting area. Designers of such outliner trimmers are forced to balance the often competing demands of enhanced visibility of the cutting area and the requirement for stabilized mechanical and electrical connection of the bladeset to the clipper drive system.

Still another challenge to hair grooming, besides creating precision modern hairstyles with such design shapes, is that the customer often needs other portions of his hair trimmed in a more conventional manner Thus, the groomer or stylist creating a complete grooming experience for the customer should be equipped with a variety of powered grooming appliances for different grooming tasks. Since the modern trend is away from corded appliances to rechargeable cordless models, the stylist often is faced with managing a crowded workspace filled with various appliances and their respective charging stands.

For customers who prefer to create and/or maintain their stylized hair at home, there is a resistance to maintaining a variety of hair cutting appliances. Also, there is a growing demand for such devices that are rinseable for cleaning or usable in the shower or bathtub. Designers of hair trimmers are challenged with addressing this new demand.

Accordingly, there is a need for an improved outliner trimmer which addresses the above-listed hair trimmer design considerations.

SUMMARY

The above-listed need is met or exceeded by the present outliner hair trimmer with interchangeable workheads. Featuring an exposed, axially-extending drive shaft that projects from the trimmer housing, the present trimmer also provides a workhead attachment system that allows the user to interchangeably connect one of a plurality of workheads with the drive shaft without the use of tools. In the present application, "without the use of tools" means that the structure for connecting the cutting workhead to the trimmer housing is constructed such that it is free from any structure that is designed to accept a tool to manipulate the same, i.e.

it is constructed for hand manipulation. Each of the workheads, preferably including a nose trimmer, a dry shaver and a hair trimmer, features an exposed, highly visible bladeset which enhances the user's ability to view the area being cut free of obstruction from the surrounding housing.

Once the user desires to change workheads, in one embodiment, unscrewing a threaded thumbscrew allows easy release of a support bracket from the trimmer housing and disconnection of the mounted workhead, and exchange of another workhead, which is engageable with the drive shaft and is releasably secured to the trimmer housing using the thumbscrew.

In another embodiment, instead of the above-described thumbscrew, the support bracket is provided in two components, one, a base portion secured to the workhead and another, a spring clip portion secured to the trimmer housing and having a complementary engagement structure engaging the base portion. Preferably, complementary formations on the two components enhance the connection of the workhead to the housing. In one embodiment, the spring clip portion includes two spring tabs exerting a biasing force on the base portion, and at least one lug matingly engaging an opening in the base portion. As such, the workhead is held to the trimmer through engagement of the drive shaft, as well as through multiple attachment points associated with the support bracket.

Still another feature of the present trimmer is that the inner drive system, motor and battery are waterproofed so that the trimmer is usable in the shower or bathtub. The waterproofing is obtained by inserting an inner trimmer chassis into a tubular sleeve of plastic film. In one embodiment, the plastic film is shrink wrap film. Radially extending disk-like flanges are disposed at each end of the chassis. As heat is applied, the shrink wrap film collapses around the trimmer components, sealing them from moisture, and the flanges become anchor points for ends of the tubular sleeve. Charging pins project from one of the flanges. At the opposite end of the chassis, a motor shaft seal prevents the entry of water into the motor. It is also preferred that a segment of resilient tubing is placed around a main on-off switch of the trimmer prior to the application of heat to the shrink wrap film. The tubing segment surrounds and protects the switch as the film collapses about the chassis, and creates a flat surface around the switch for the shrinking film. In another embodiment, the film is secured to the chassis by welding or the like at the enlarged flanges.

More specifically, a hair trimmer is provided, including a trimmer housing having a drive end, a drive shaft projecting from the drive end, a support bracket associated with the drive end, and a cutting workhead connectable to the drive shaft and being supported on the trimmer by the support bracket. The cutting workhead is removable from operational engagement with the trimmer housing without the use of tools.

In another embodiment, a hair trimmer is provided, including a trimmer housing having a drive end, a drive shaft projecting from the drive end, a chassis having one end associated with the drive shaft and an opposite end having at least one projecting charging pin, a radially enlarged flange is disposed at each of the ends. A tubular sleeve of heat deformable plastic film is dimensioned for slidingly surrounding the chassis and extending axially at least to the flanges, such that upon application of heat, the sleeve deforms around the chassis and forms a watertight enclosure.

In still another embodiment, a hair trimmer assembly is provided, including a trimmer housing having a drive end, a drive shaft projecting from the drive end, a support bracket associated with the drive end, a plurality of interchangeable cutting workheads, each connectable to the drive shaft and being supported on the trimmer by the support bracket, and each cutting workhead being removable from engagement with the trimmer housing without the use of tools.

DETAILED DESCRIPTION

Figure 1:
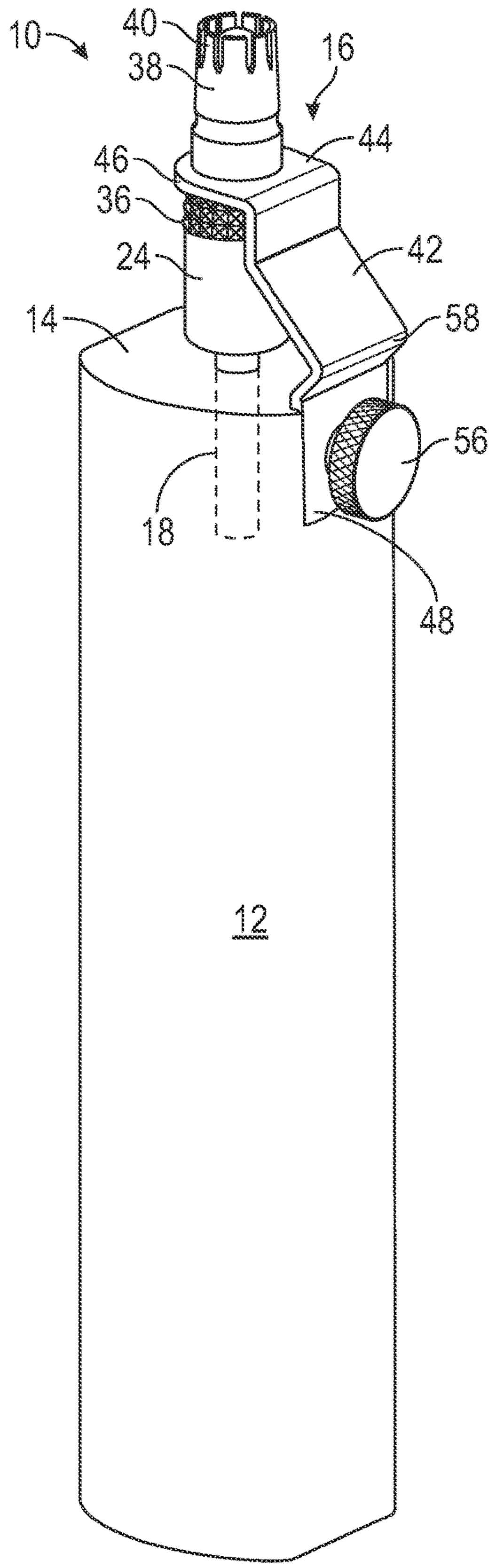
FIG. 1 is a top perspective view of the present hair trimmer equipped with a nose trimmer workhead.
Figure 2:
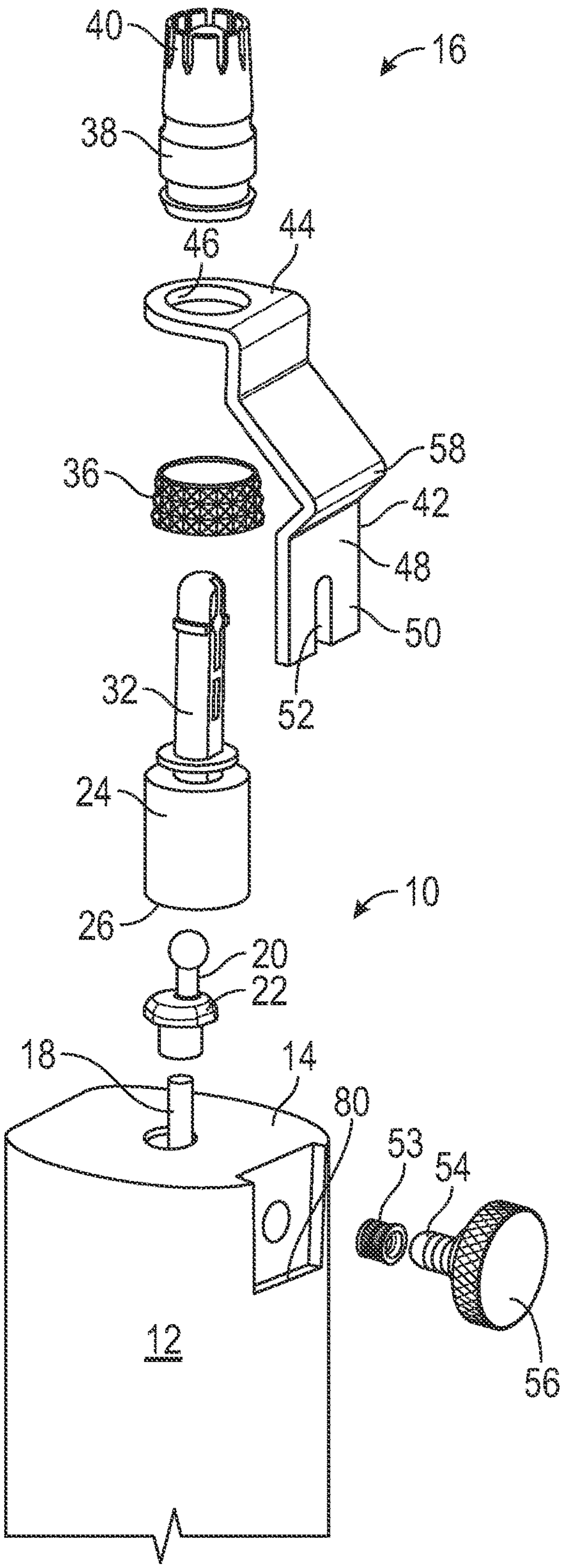
FIG. 2 is a fragmentary exploded perspective view of the hair trimmer of FIG. 1.
Figure 4:
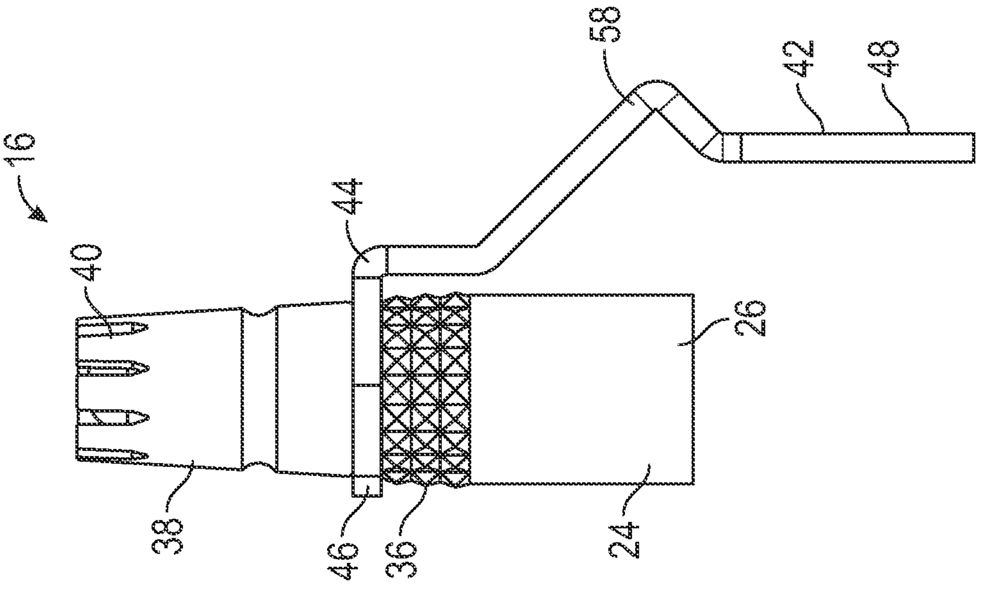
FIG. 4 is a side elevation of the nose trimmer workhead and support bracket.

Referring now to FIGS. 1-4, an outliner hair trimmer is generally designated 10, and includes a trimmer housing 12 having a drive end 14. A feature of the present hair trimmer 10 is that it is configured for operationally engaging a plurality of cutting workheads. The first such cutting workhead is a nose trimmer, generally designated 16.

Figure 3:
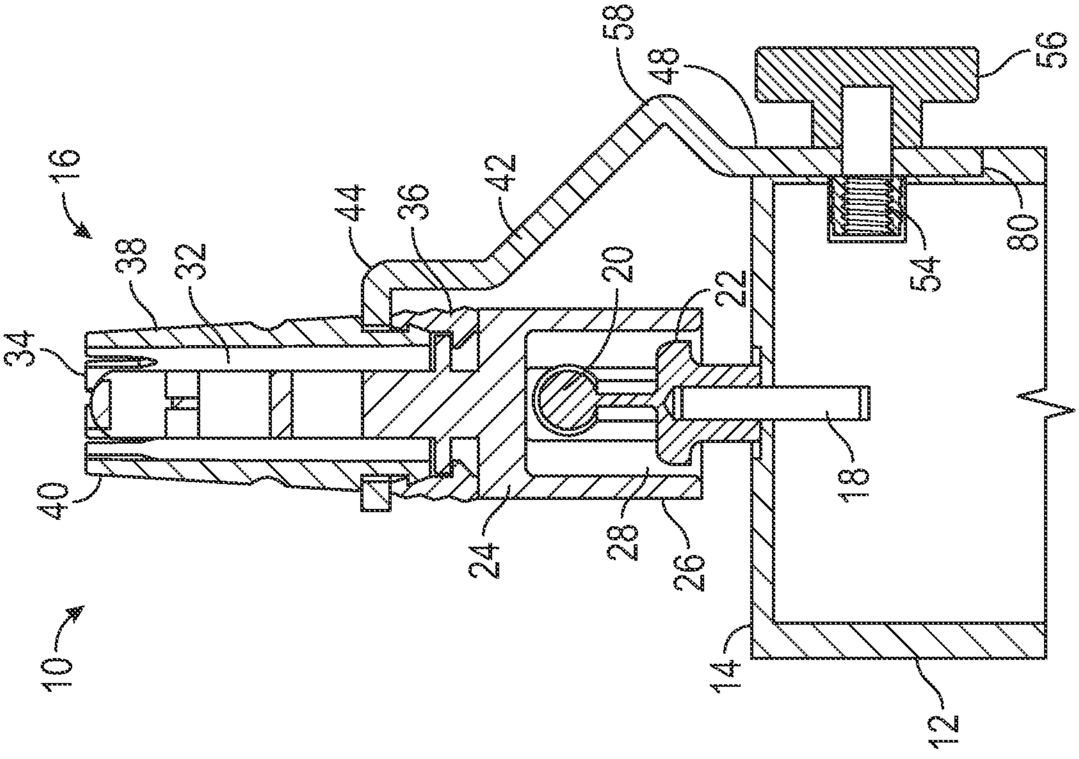
FIG. 3 is a fragmentary vertical cross-section of the hair trimmer of FIG. 1.
Figure 6:
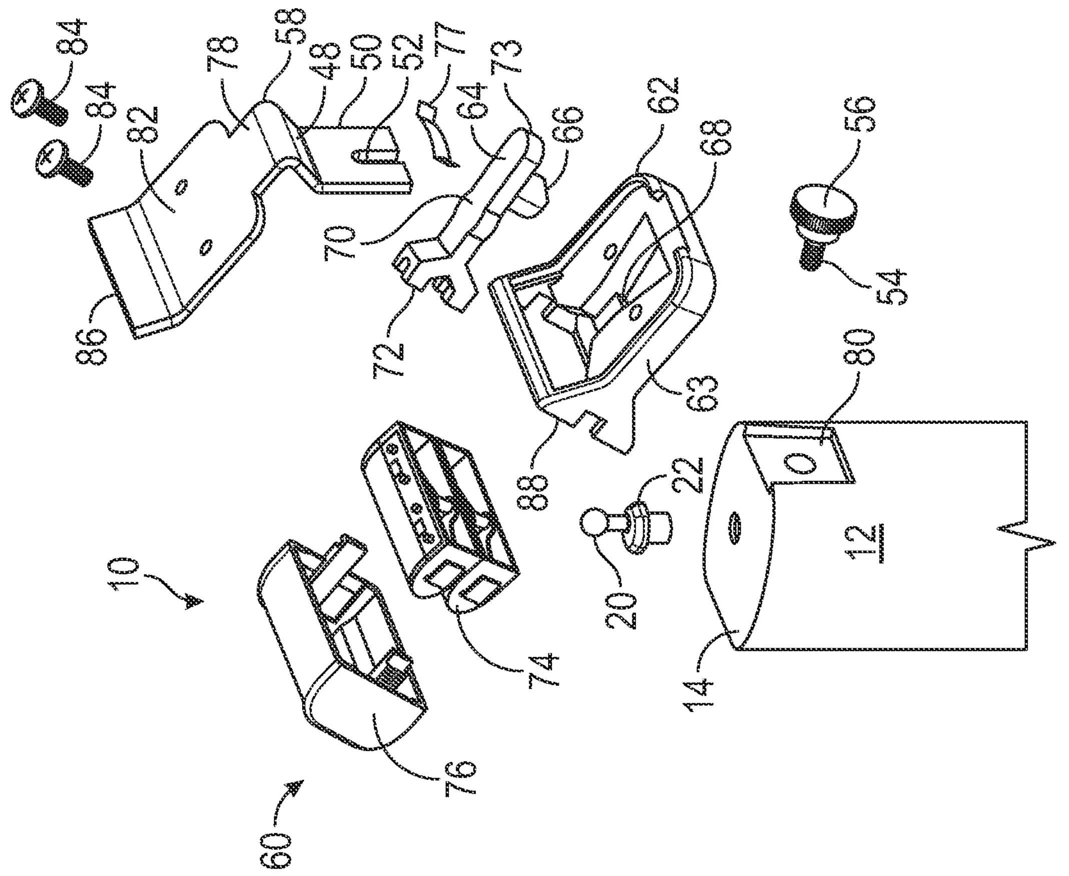
FIG. 6 is an exploded perspective view of the hair trimmer of FIG. 5.
Figure 5:
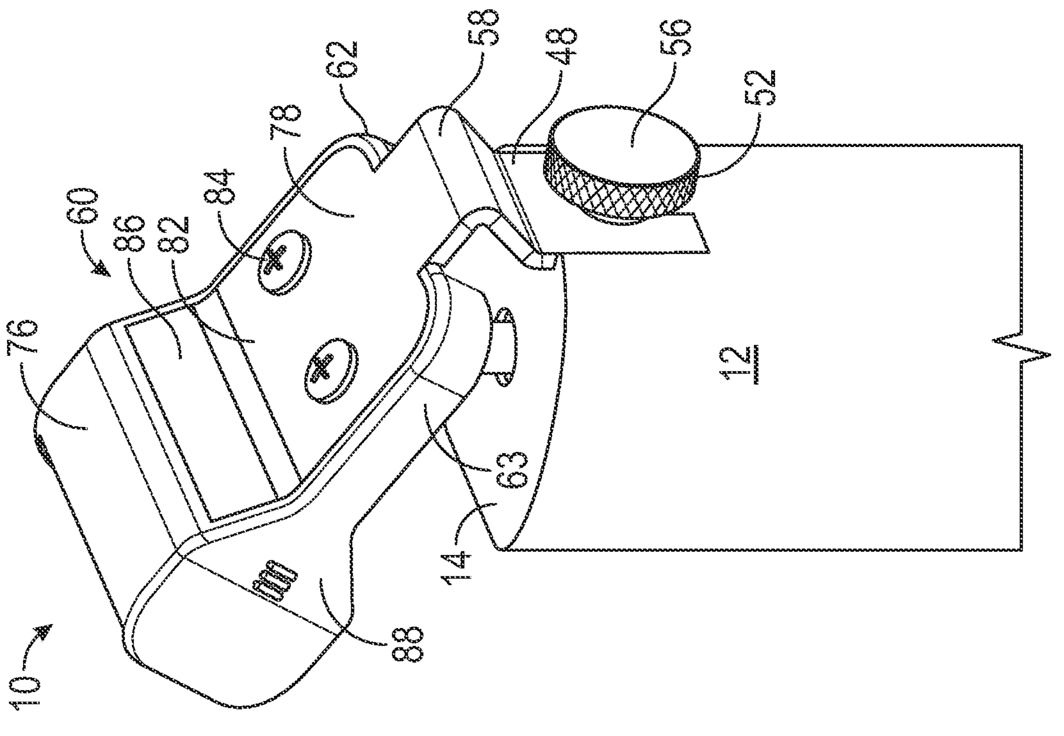
FIG. 5 is a fragmentary top perspective view of the present hair trimmer equipped with a dry shaver workhead or foil that is usable with water.
Figure 8:
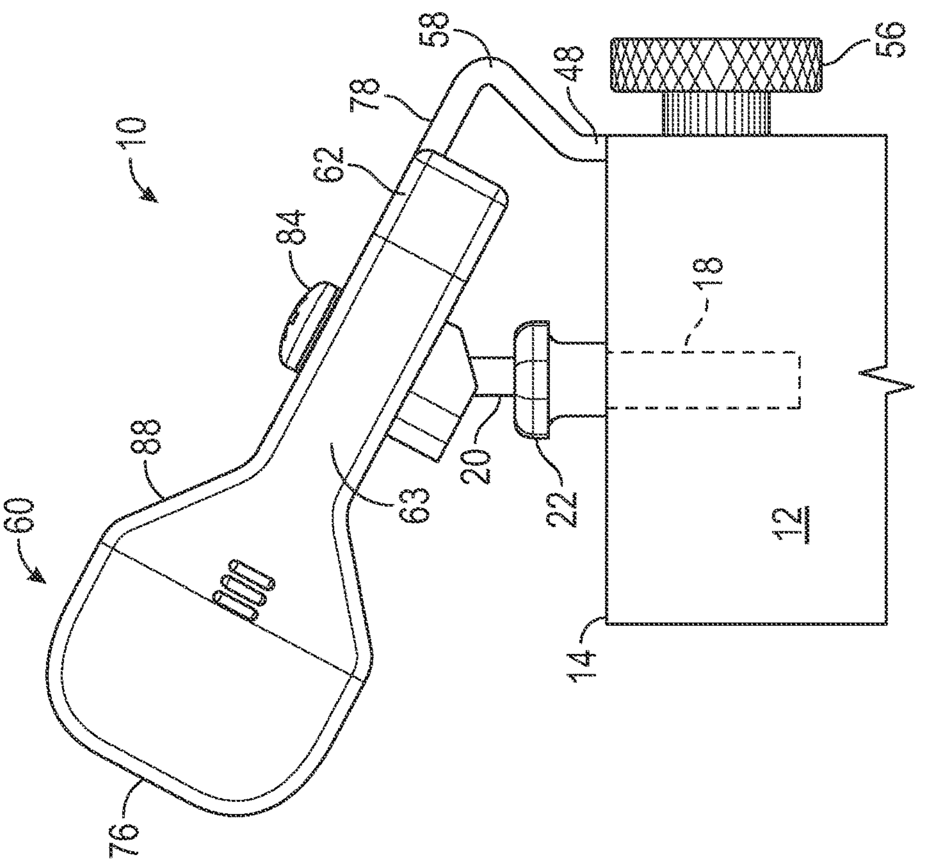
FIG. 8 is a side elevation of the hair trimmer of FIG. 5.
Figure 7:
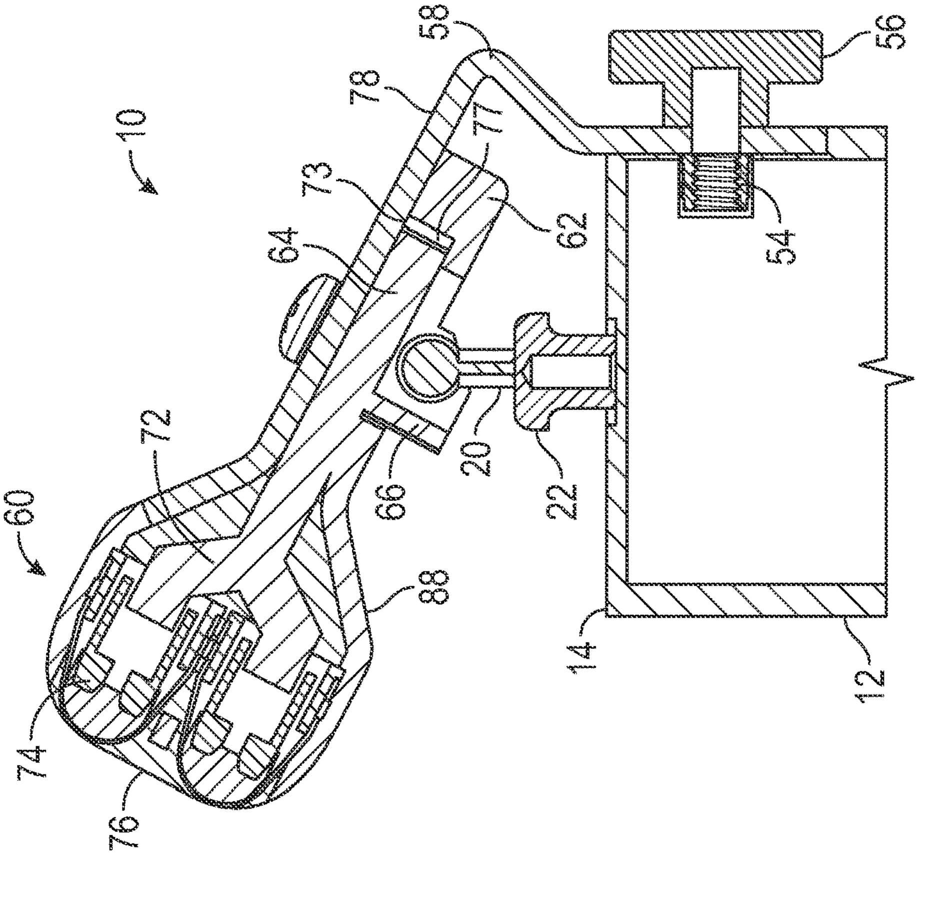
FIG. 7 is a vertical cross-section of the hair trimmer of FIG. 5.

The nose trimmer workhead 16 engages a drive shaft 18 that projects from the drive end 14 and is connected to an offset or eccentric cam 20 having a polygonal, preferably hexagonal, drive formation 22. In the nose trimmer workhead 16, a cam follower 24 has a base 26 with an internal recess 28 that matingly engages the drive formation 22 for common rotation by the drive shaft 18, being driven by a motor 30 (FIG. 28) as is known in the art. A tubular, moving blade 32 having a plurality of teeth 34 is drivingly engaged by, and rotates with the cam follower 24 (FIG. 3). A knurled collar 36 secures a tubular outer or stationary blade 38 having a plurality of stationary blade teeth 40 in relation to the cam follower 24 so that the moving blade 32 rotates internally of, and relative to the stationary blade 38 as is known in the art.

Hairs extending internally past the stationary blade teeth 40 are sheared by the action of the rotating moving blade teeth 34. By extending axially from the drive end 14 of the housing 12, the nose trimmer workhead 16 is relatively exposed and as such provides enhanced user visibility of the target cutting area.

To provide structural support to the nose trimmer workhead 16, and also to provide a releasable connection with the trimmer housing 12, a support bracket 42 is associated with the drive end 14 of the housing. The support bracket 42 is also connected to the cutting workhead 16. More specifically, the present support bracket 42 has a first end 44 configured for engaging the nose trimmer workhead 16, preferably having a loop 46 at least partially surrounding the stationary blade 38. The loop 46 is held in place against the stationary blade 38 by the knurled collar 36. Opposite the first end 44, a second end 48 is configured for engaging the clipper housing 12. In the preferred embodiment, the second support bracket end 48 has a clevis shape 50 defining a slot 52 (FIG. 2) that slidingly engages a threaded female insert 53 and thumbscrew 54 with a knurled or otherwise grip-enhanced knob 56. Also preferred, the support bracket 42 has a mid-portion 58 forming an angle for enhanced strength.

To remove the nose trimmer workhead 16 from the trimmer housing 12, the user manually unscrews the thumbscrew 54 and axially pulls the workhead out of engagement with both the thumbscrew as well as the eccentric cam 20. Installation of the nose trimmer workhead 16 is achieved by reversing the above process. Thus, the nose trimmer workhead 16 is removable from operational engagement with the trimmer housing 12 without the use of tools.

Referring now to FIGS. 5-8, another cutting workhead that is readily disengageable from the trimmer housing 12 is generally referred to as a dry shaver or shaver workhead 60. Although referred to herein as a "dry" shaver, the present workhead 60 is usable with water. The shaver workhead 60 includes a workhead housing 62 that is configured with a relatively slim profile to enhance user visibility of the cutting area. As such, a sidewall 63 is relatively short vertically and is shorter than a relatively wider, flared end described below as 88. Included in the workhead housing 62 is a pivoting rocker arm 64 having a cam follower socket 66 that engages the eccentric cam 20 through an opening 68 in the workhead housing. The opening 68 defines an operational channel for the pivoting action of the rocker arm 64. Reciprocally pivoting relative to the workhead housing 62 about a pivot point 70, opposite the cam follower socket 66, a free end 72 of the rocker arm 64 engages moving shaver blades 74 to linearly reciprocate them relative to the fixed, perforated, stationary blade or foil 76. A bias element 77 such as a spring is positioned between a rear end 73 of the rocker arm 64 opposite the free end 72 and an adjacent portion of the opening 68 (FIG. 7) and, through biasing action on the rocker arm, urges the moving blades 74 against the stationary blade 76. As is well known in the art, the direction of linear reciprocation of the moving shaver blades 74 is transverse to a longitudinal axis of the trimmer housing 12. Hairs which project into the perforated stationary blade 76 are clipped by the reciprocating moving shaver blades 74.

In similar fashion to the nose trimmer workhead 16, the dry shaver cutting workhead 60 is releasably operationally engageable with the trimmer housing 12 through the use of a support bracket 78, which is similar to the support bracket 42 in that a second end 48 has a clevis shape 50 with a slot 52. The clevis shape 50 releasably engages the thumbscrew 54 in the same manner as described above in relation to the nose trimmer workhead 16. In addition to the fastening power of the thumbscrew 54, the drive end 14 of the trimmer housing is provided with a polygonal clevis recess 80 that captures the second end 48 and prevents twisting of the bracket 42, 78 relative to the housing.

Opposite the second end 48, a first end 82 of the support bracket 78 is securely fastened to the workhead housing 62 using at least one, and preferably a pair of fasteners 84. An upper edge 86 of the support bracket 78 is angled to engage a flared blade end 88 of the workhead housing 62, and the mid portion 58 has a similar angle as is the case with the nose trimmer workhead 16. The upper edge 86 also is removable from the workhead 60 so that any trapped hair can be removed from an interior of the workhead. While the present upper edge 86 is integral with the first end 82, it is also contemplated that the upper edge is optionally provided as a separate door structure that is removable without removing the fasteners 84.

Referring now to FIGS. 9-12, a third type of cutter workhead is generally designated a hair trimmer workhead 90. Upon mounting to the drive end 14 of the trimmer housing 12 and engagement upon the drive shaft 18, the hair trimmer workhead 90 provides an exposed bladeset 92 including a stationary blade 94 having stationary blade teeth 96, and a laterally reciprocating moving blade 98 with moving blade teeth 100. As such, the user or stylist can more clearly view the area being cut, for achieving a desired precision and detail cut according to current fashion.

As is the case with the nose trimmer workhead 16 and the dry shaver workhead 60, the hair trimmer workhead 90 is connected to the trimmer housing 12 by a support bracket 102. A second end 48 of the support bracket has the clevis shape 50 defining the slot 52 for releasable engagement with the thumbscrew 54 as described above. The second end 48 is received or captured within the clevis recess 80 in the trimmer housing 12. Further, the support bracket 102 has the angled mid-portion 58 in similar fashion to the previously described support brackets 42, 78.

Figure 10:
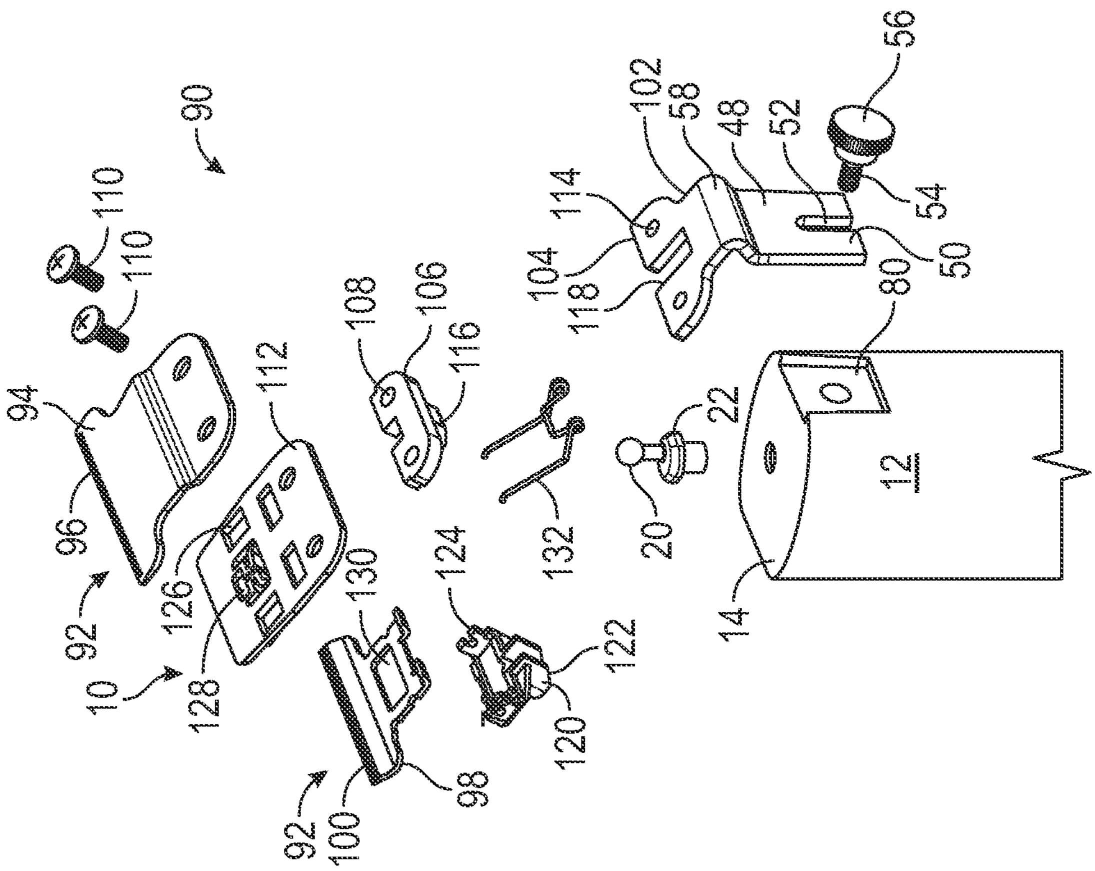
FIG. 10 is an exploded perspective view of the hair trimmer of FIG. 9.
Figure 9:
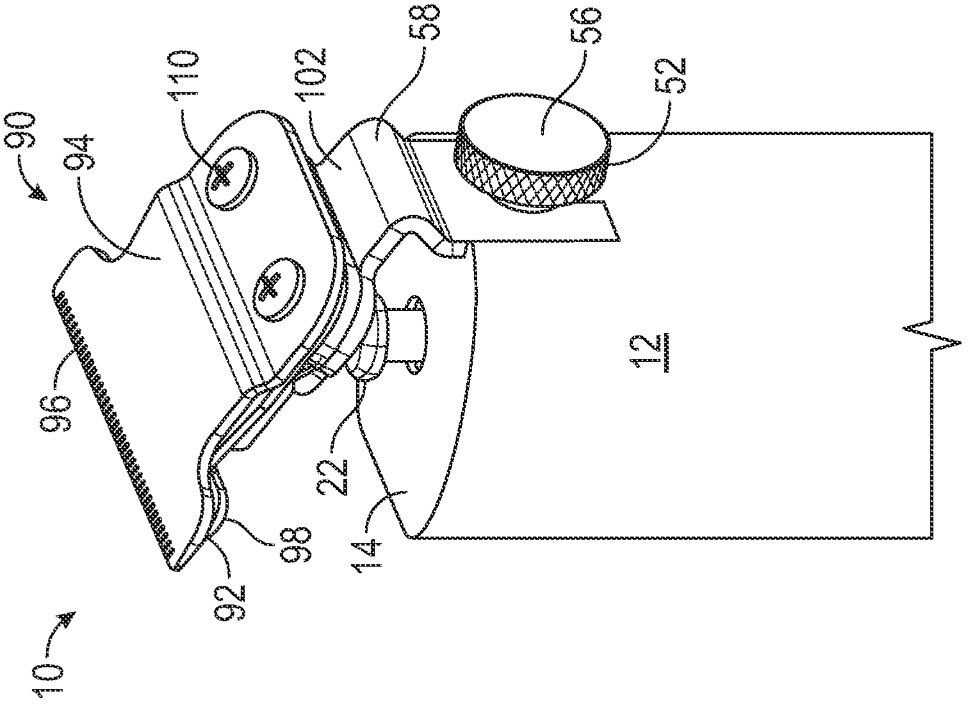
FIG. 9 is a fragmentary top perspective view of the present hair trimmer equipped with a hair trimmer workhead.
Figure 12:
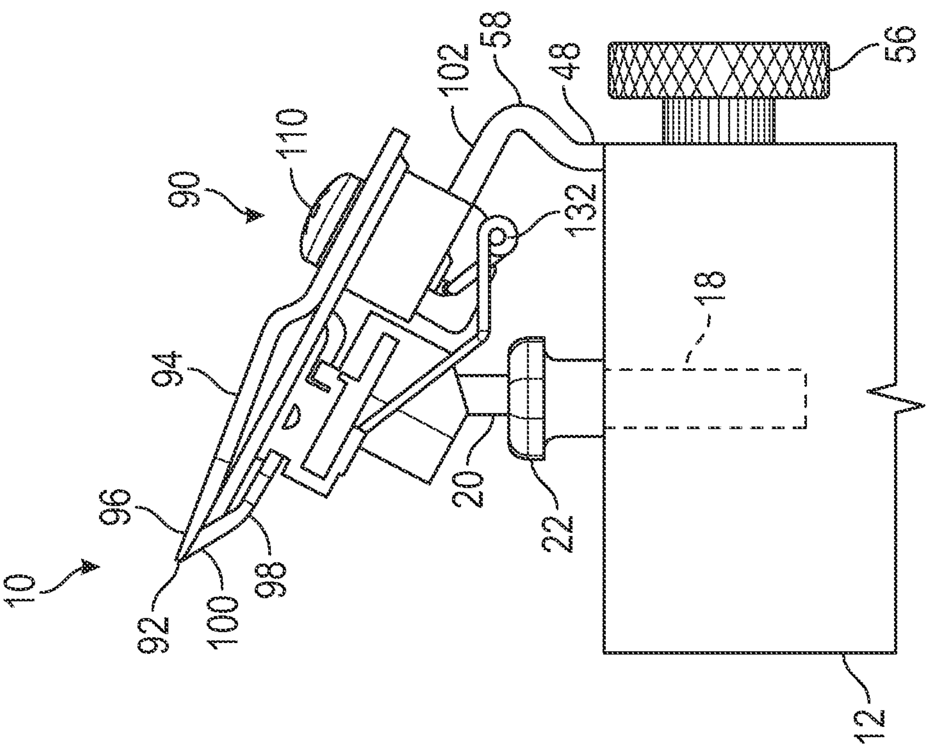
FIG. 12 is a side elevation of the hair trimmer of FIG. 9.
Figure 11:
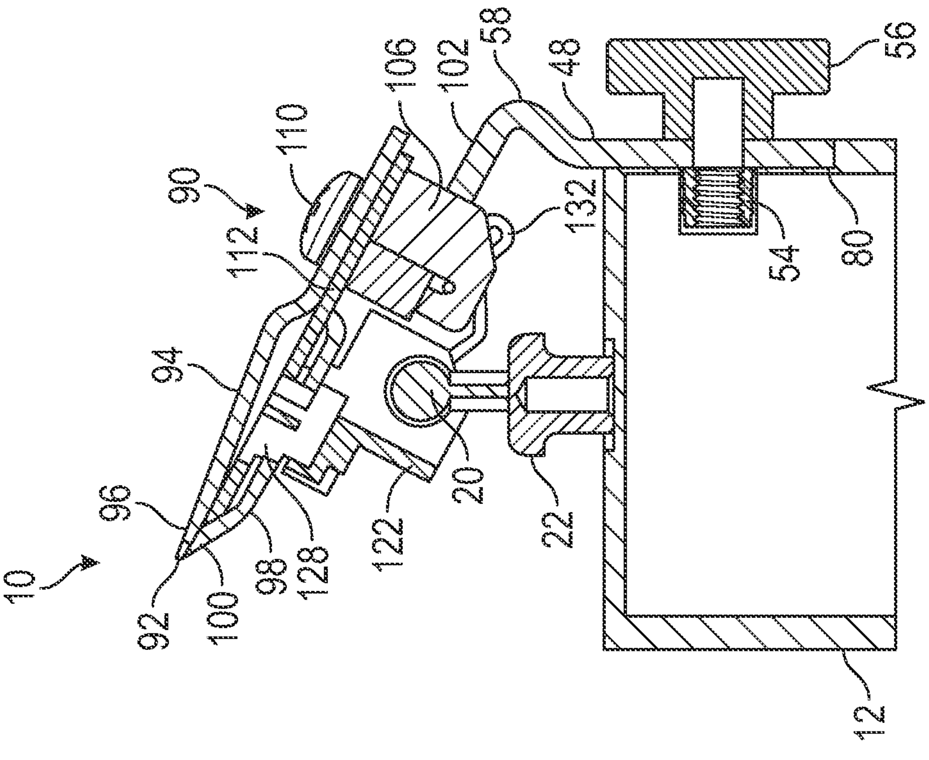
FIG. 11 is a vertical cross-section of the hair trimmer of FIG. 9.

Referring now to FIG. 10, opposite the second end 48, the support bracket 102 has a first end 104 configured for attachment to the hair trimmer workhead 90. A connector 106 features bores 108 for receiving fasteners 110, preferably screws or the like, which hold the stationary blade 94 and a blade guide 112 together as a unit. Also, the fasteners 110 hold the stationary blade 94, the blade guide 112 and the connector 106 to the first end 104 via engagement in threaded openings 114. A depending lug 116 on the connector also matingly engages a slot 118 in the first end 104 of the support bracket 102 for stabilizing the workhead 90 during operation.

As is well known in the art relating to hair trimmers, the hair trimmer workhead 90 includes a cam follower 120 with a socket 122 constructed and arranged for engaging the eccentric cam 20. Prongs 124 on the cam follower 120 engage openings 126 in the blade guide 112, and formations 128 on the blade guide engage a central opening 130 in the moving blade 98 to maintain the lateral reciprocating trajectory of the moving blade relative to the stationary blade 94. A biasing element 132 such as a spring urges the cam follower 120 and the moving blade 98 against the stationary blade 94. In performing detailed trimming with the hair trimmer workhead 90, it is preferred that the stationary blade teeth 96 and the moving blade teeth 100 are positioned so that the respective tips of the teeth of each blade are in close alignment with each other.

As is the case with the nose trimmer workhead 16 and the dry shaver workhead 60, when the user desires to exchange the hair trimmer workhead 90 for another, the thumbscrew 54 is loosened through manipulation of the knob 56. The workhead 90 is then disengaged from the trimmer housing 12 and the drive shaft 18 and the eccentric cam 20 through axial displacing movement.

Referring now to FIGS. 13-24, an alternate embodiment for the support brackets 42, 78, 102 described above is depicted. Instead of using the thumbscrew 54 and associated components, the alternate support bracket is generally designated 140, and includes two portions, a base portion 142 fixed to the cutting end 14 of the trimmer housing, and a releasable spring clip portion 144 that includes the first end of the support bracket and is disengageable from the base portion by user manipulation in a twisting motion without the use of tools. Construction of the respective cutting workheads 16, 60 and 90 is the same, and components of those workheads using the support bracket 140 are designated with reference numbers corresponding to those discussed previously.

Referring now to FIGS. 13-16, more specifically the nose trimmer workhead 16 described previously in relation to FIGS. 1-4 is shown with the alternate support bracket 140. Included on the base portion 142 of the bracket 140 is a second end 146 which is secured within the clevis recess 80 of the trimmer housing 12 using a fastener 148 such as a screw or the like. Also included on the support bracket base portion 142 is an angled mid portion 58.

Figure 14:
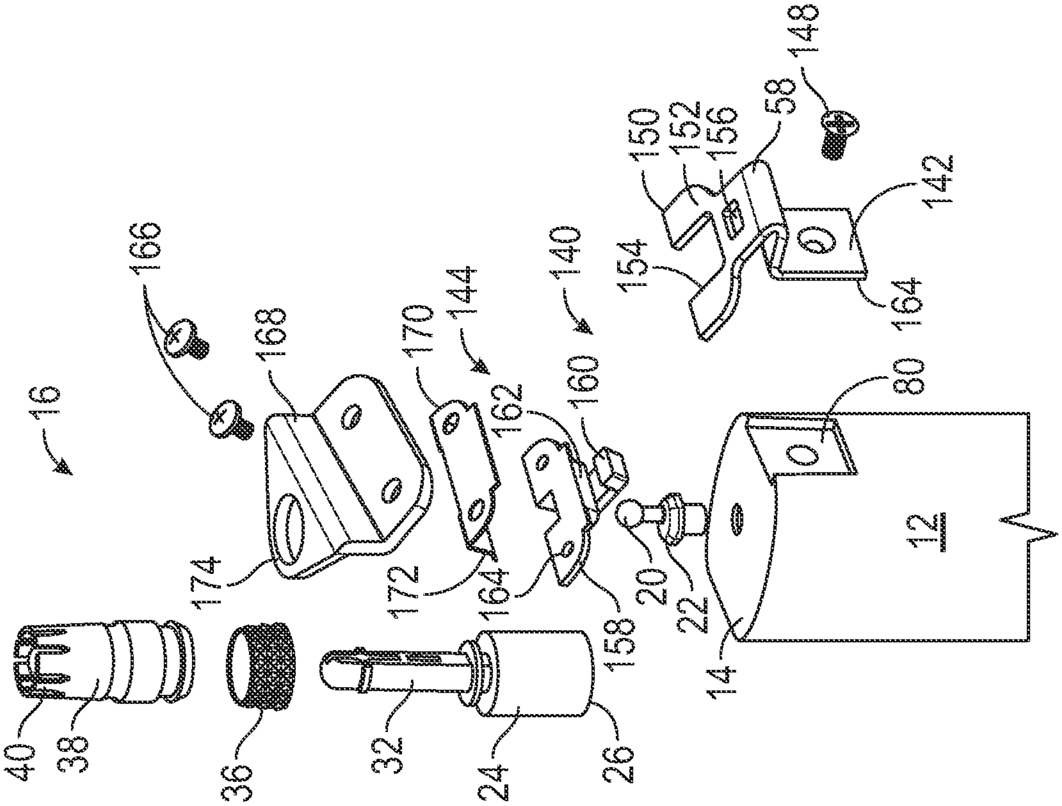
FIG. 14 is a fragmentary exploded perspective view of the hair trimmer of FIG. 13.
Figure 13:
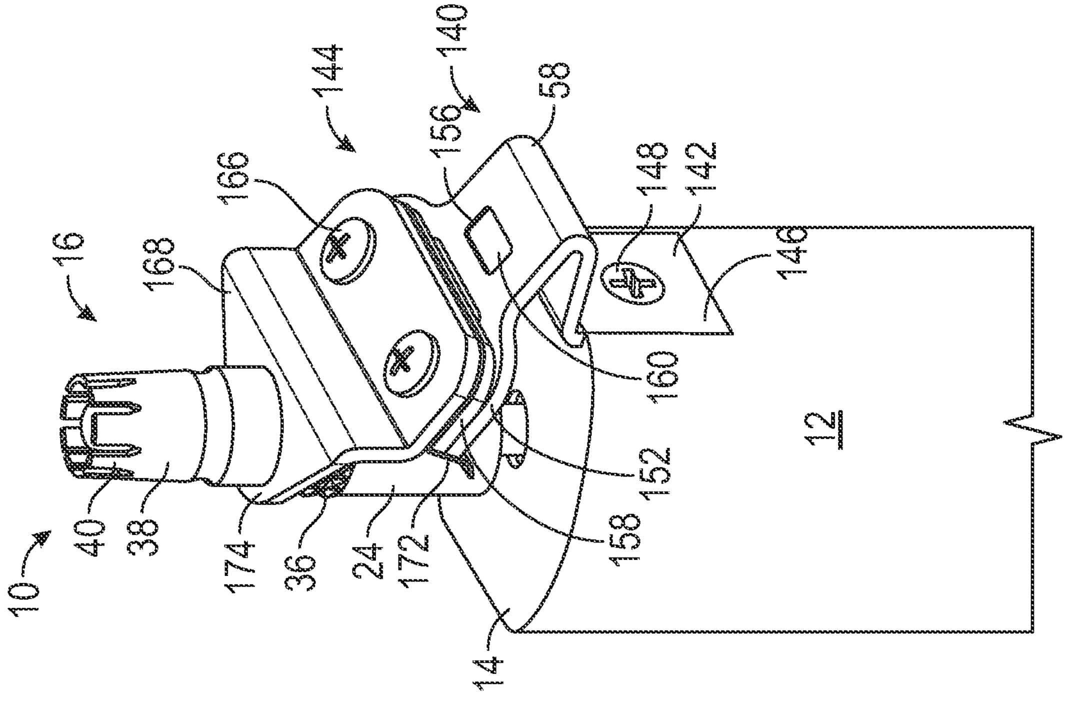
FIG. 13 is a fragmentary top perspective view of the present hair trimmer equipped with a nose trimmer workhead and a spring-clip support bracket.
Figure 16:
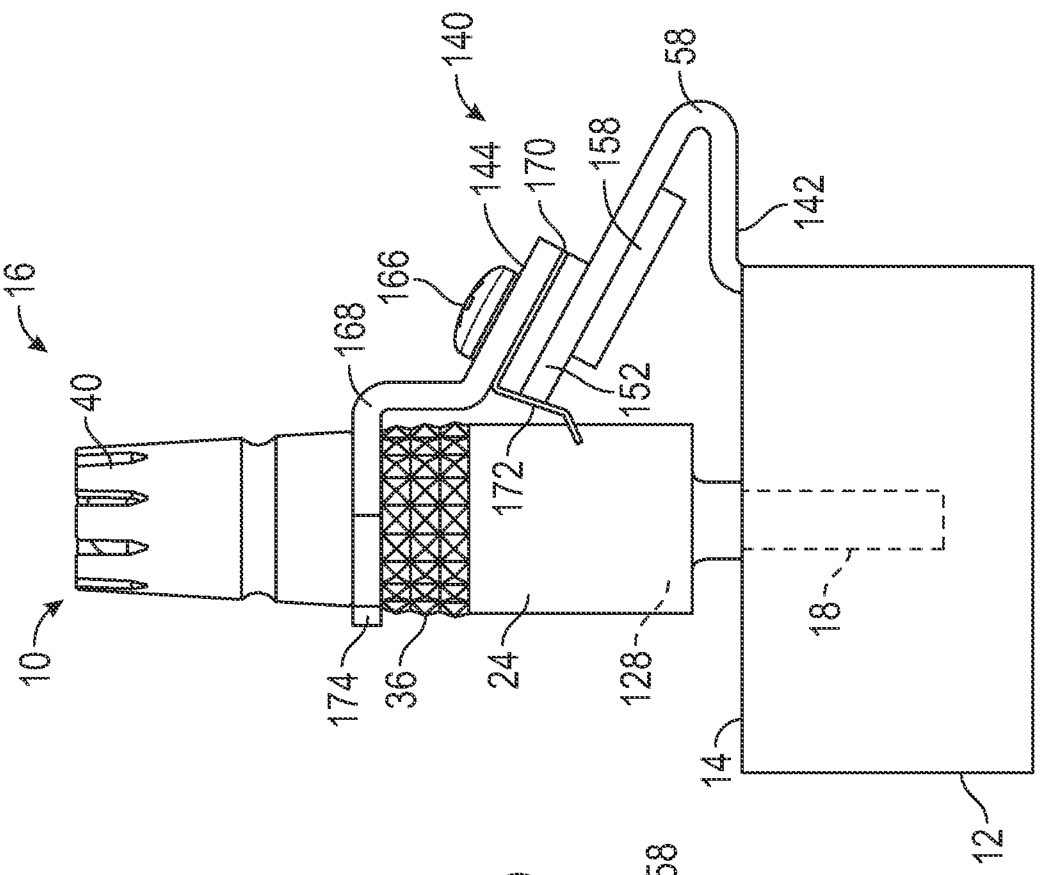
FIG. 16 is a side elevation of the hair trimmer of FIG. 13.
Figure 15:
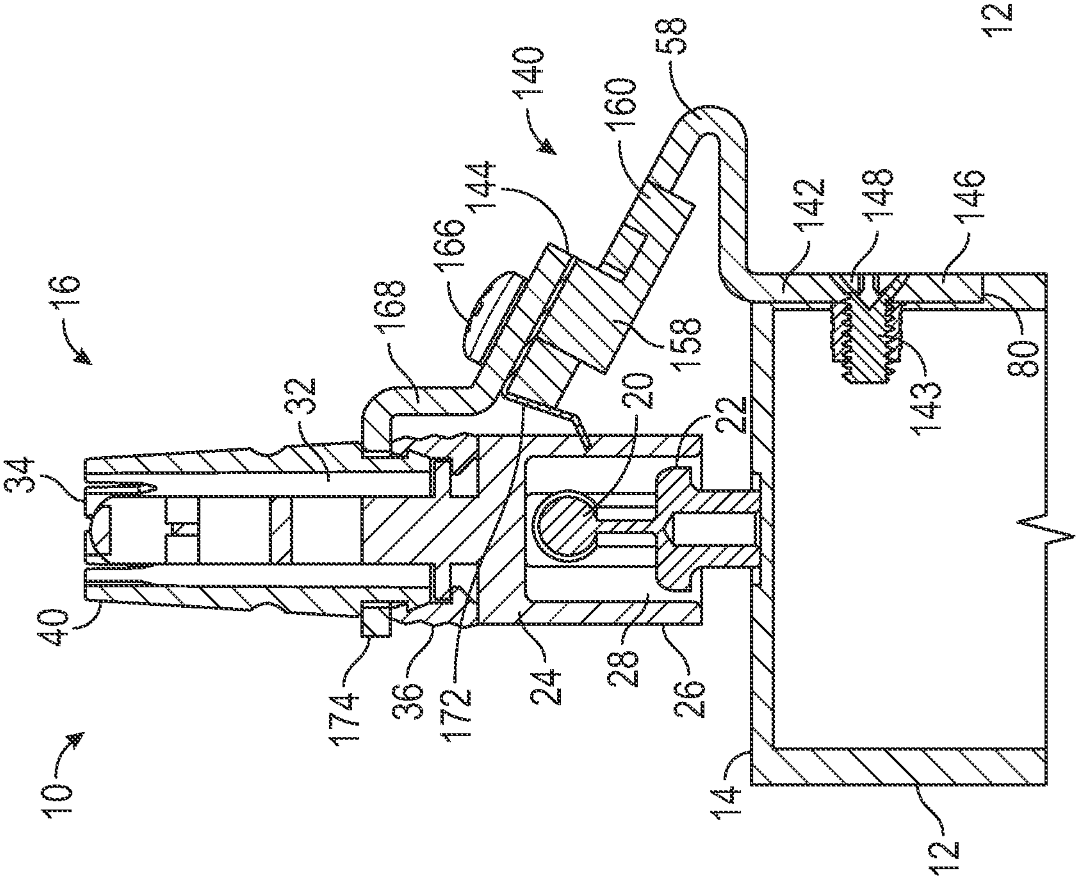
FIG. 15 is a vertical cross-section of the hair trimmer of FIG. 13.
Figure 18:
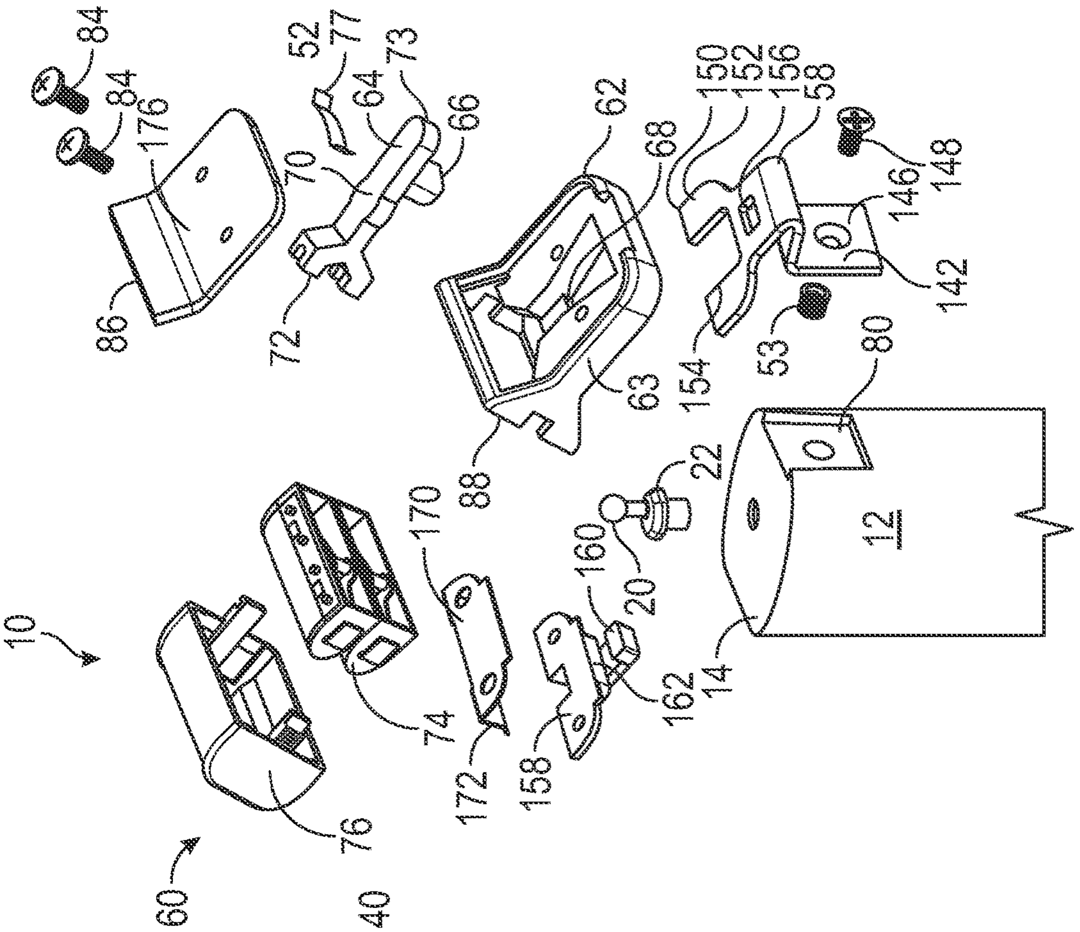
FIG. 18 is a fragmentary exploded view of the hair trimmer of FIG. 17.
Figure 17:
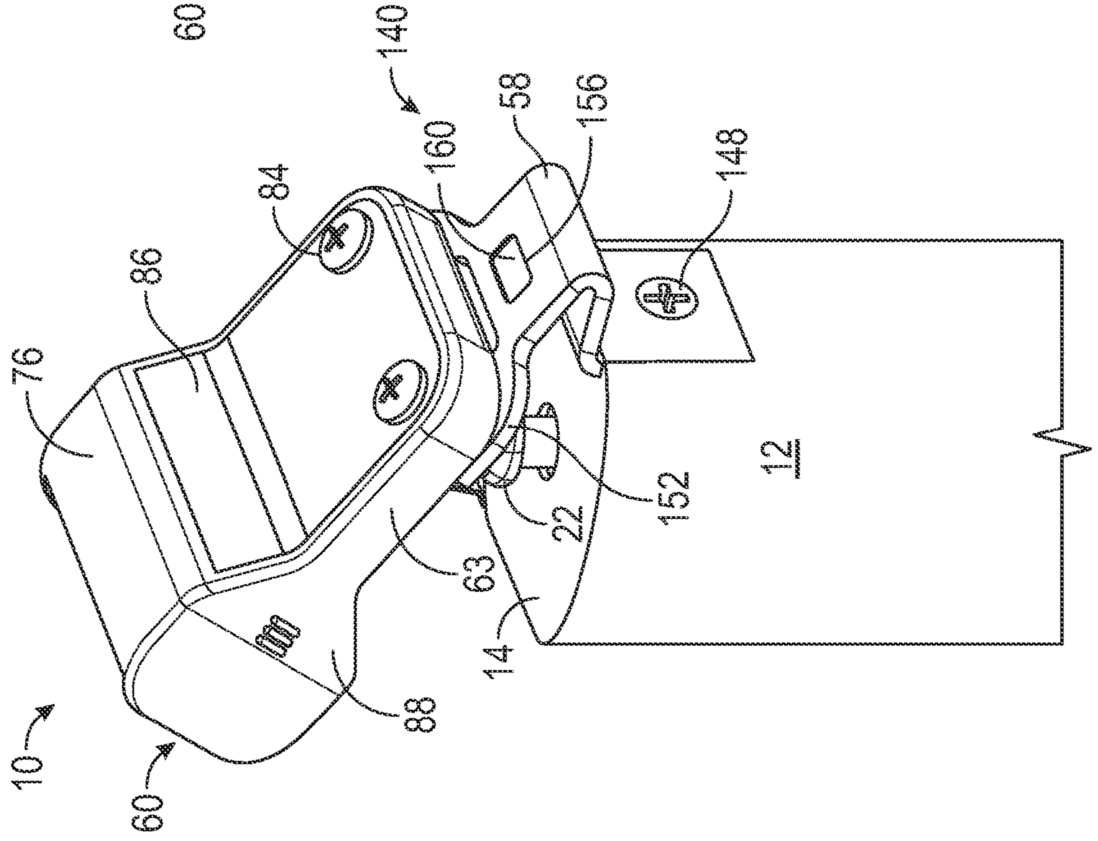
FIG. 17 is a fragmentary top perspective view of the present hair trimmer with a dry shaver workhead and a spring-clip support bracket.
Figure 20:
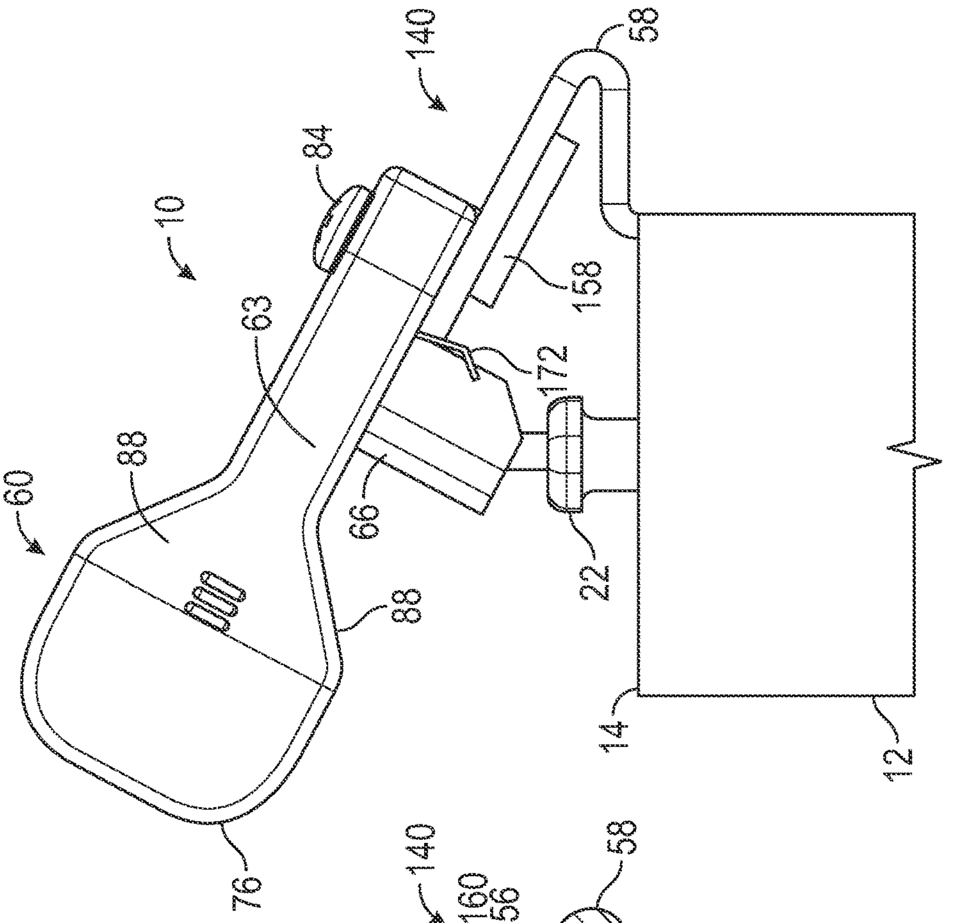
FIG. 20 is a side elevation of the hair trimmer of FIG. 17.
Figure 19:
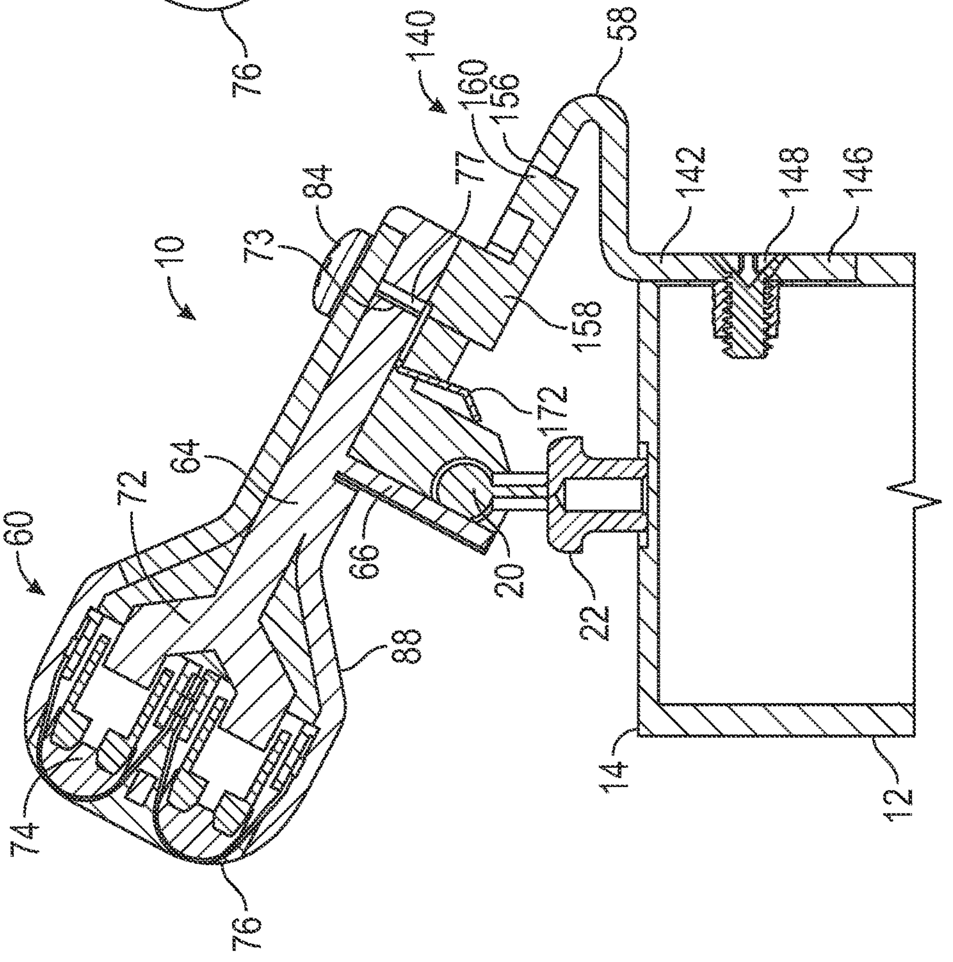
FIG. 19 is a vertical cross-section of the hair trimmer of FIG. 17.
Figure 22:
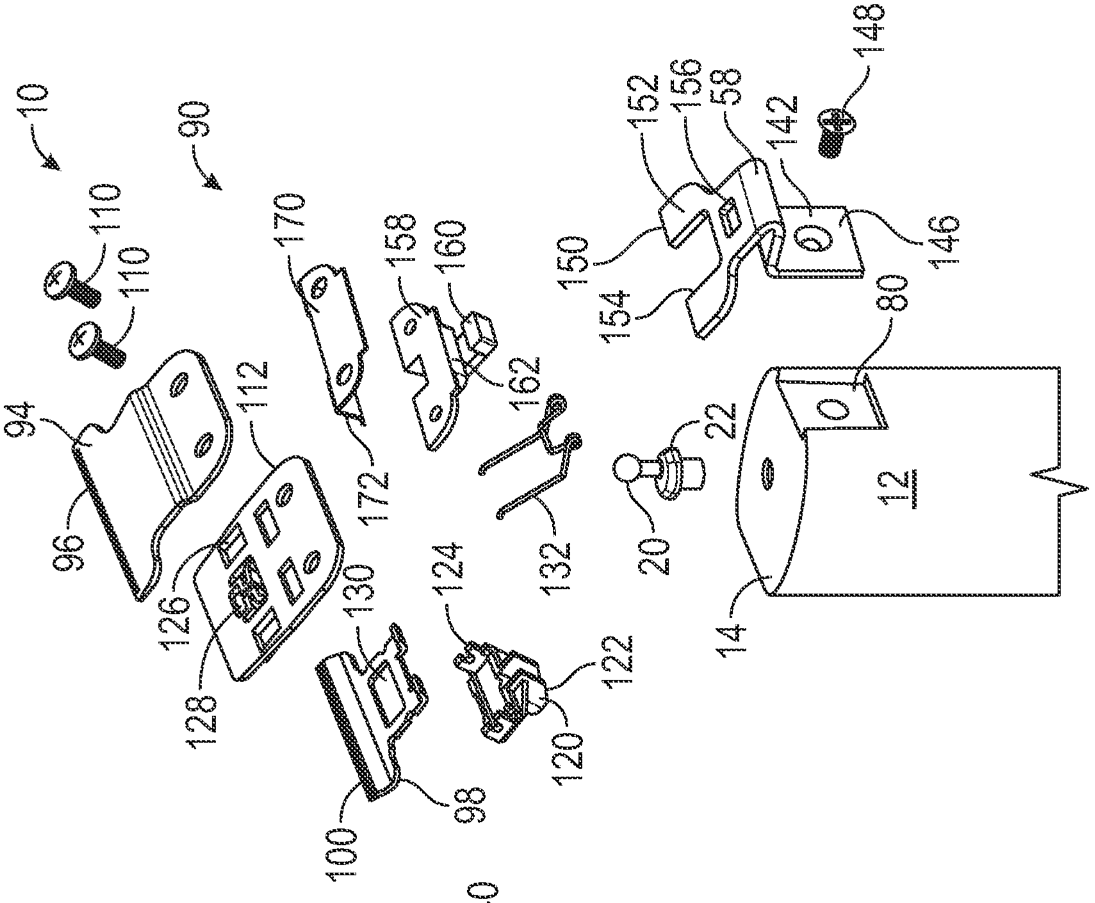
FIG. 22 is a fragmentary exploded view of the hair trimmer of FIG. 21.
Figure 21:
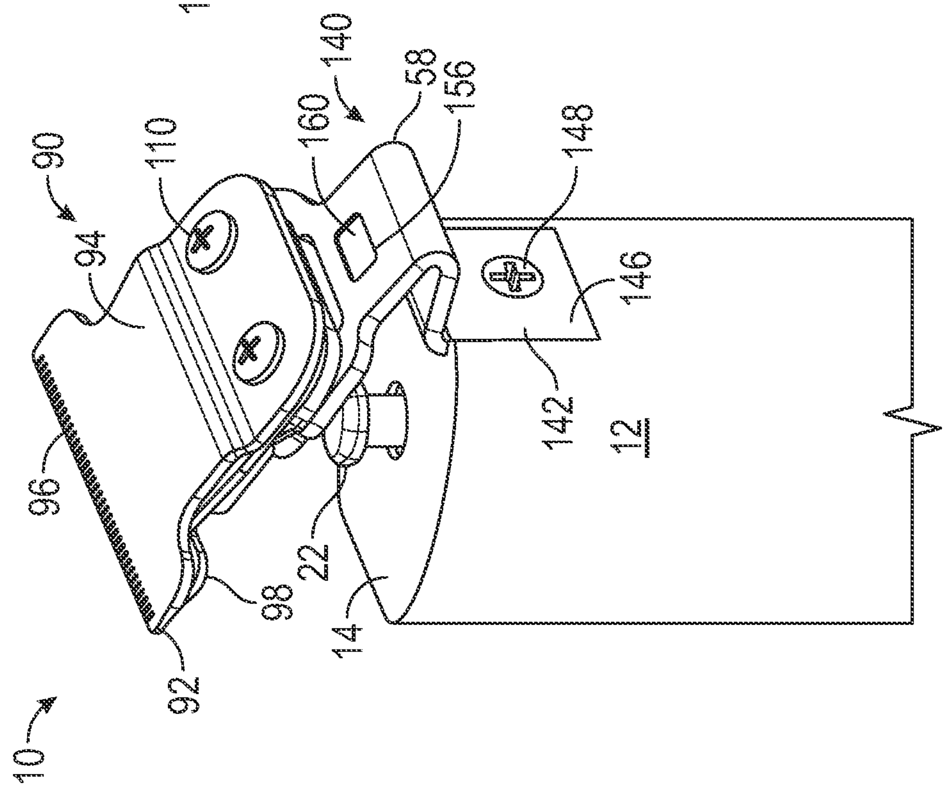
FIG. 21 is a fragmentary top perspective view of the present hair trimmer mounted using a spring-clip support bracket.
Figure 23:
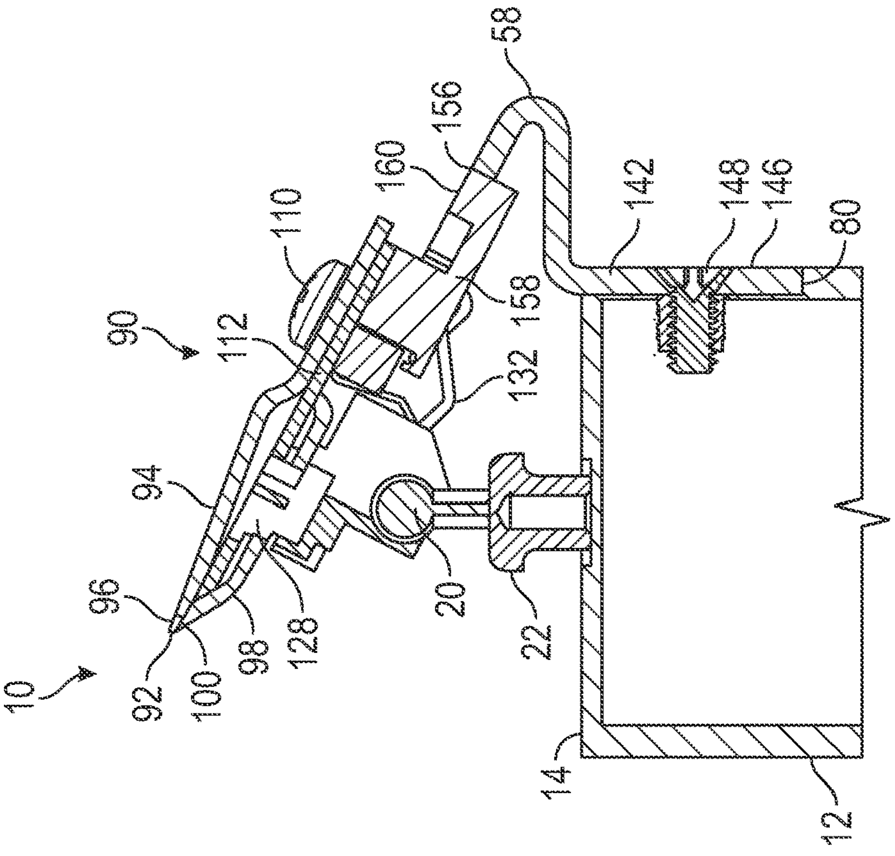
FIG. 23 is a vertical cross-section of the hair trimmer of FIG. 21.
Figure 24:
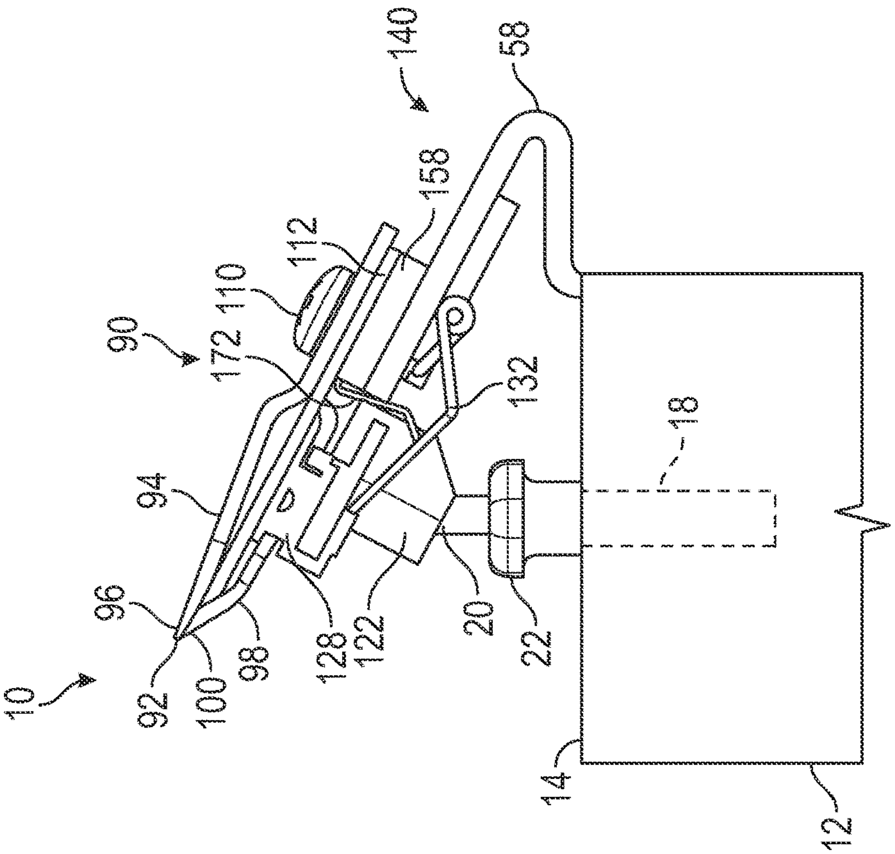
FIG. 24 is a side elevation of the hair trimmer of FIG. 21.

Referring now to FIG. 14, an upper end 150 of the base portion 142 is generally "Y"-shaped, having a pair of laterally spaced arms 152 defining a recess 154. A locating opening 156, preferably polygon-shaped, is positioned between the recess 154 and the angled mid-portion 58, in a portion of the upper end 150 forming a vertical base of the "Y"-shape.

Turning now to the spring clip portion 144, a spring connector 158 includes a lug 160 configured for matingly engaging the locating opening 156, a depending formation 162 configured for matingly engaging the recess 154, and at least one, and preferably a pair of mounting openings 164. Fasteners 166, preferably screws or the like, secure a workpiece bracket 168 to a spring 170 and to the mounting openings 164 of the spring clip portion 144. Included on the spring 170 is at least one and preferably a pair of depending spring tabs 172 which engage and are urged against the arms 152. Similar to the loop 46, a workpiece ring 174 on the workpiece bracket 168 at least partially surrounds the stationary blade 38 of the nose trimmer workhead 16.

Thus, the nose trimmer workhead 16, the workpiece bracket 168, the spring 170 and the spring connector 158 are releasably engageable as a unit on the base portion 142 of the support bracket 140. Secure operational connection is achieved through engagement of the spring tabs 172 on the arms 152, the depending formation 162 in the recess 154, and the lug 160 in the locating opening 156. In addition, the workhead 16 is operationally engaged on the eccentric cam 20 at the formation 22 as described previously. The user is able to readily attach the nose trimmer workhead 16 with the above-listed components of the support bracket 140 to the trimmer housing 12 using a twisting motion and without the use of tools.

Referring now to FIGS. 17-20, the dry shaver workhead 60 described previously in relation to FIGS. 5-8 is shown equipped with the alternate support bracket 140. Components which are identical to those described above are designated with the same reference numbers. The second end 146 of the support bracket 140 is fastened within the clevis recess 80 as described above.

A first end or cover 176 closes the workpiece housing 62 and is held in place by the fasteners 84, which extend through the workpiece housing and secure the spring 170 to the spring connector 158. Thus, the dry shaver workhead 60, the first end 176, the spring 170 and the spring connector 158 are operationally engaged on the base portion 142 as described previously, and are readily disengageable from the base portion 142 using a twisting motion by the user without the use of tools.

Referring now to FIGS. 21-24, the hair trimmer workhead 90, described above in relation to FIGS. 9-12 is shown with the alternate support bracket 140. The fasteners 110 secure the stationary blade 94, the blade guide 112, the spring 170 and the spring connector 158 to each other as a unit. Thus, the hair trimmer workhead 90, including the bladeset 92 and the spring clip portion 144 are operationally engaged on the base portion 142 as described previously, and are readily disengageable from the base portion 142 using a twisting motion by the user without the use of tools.

Figure 27:
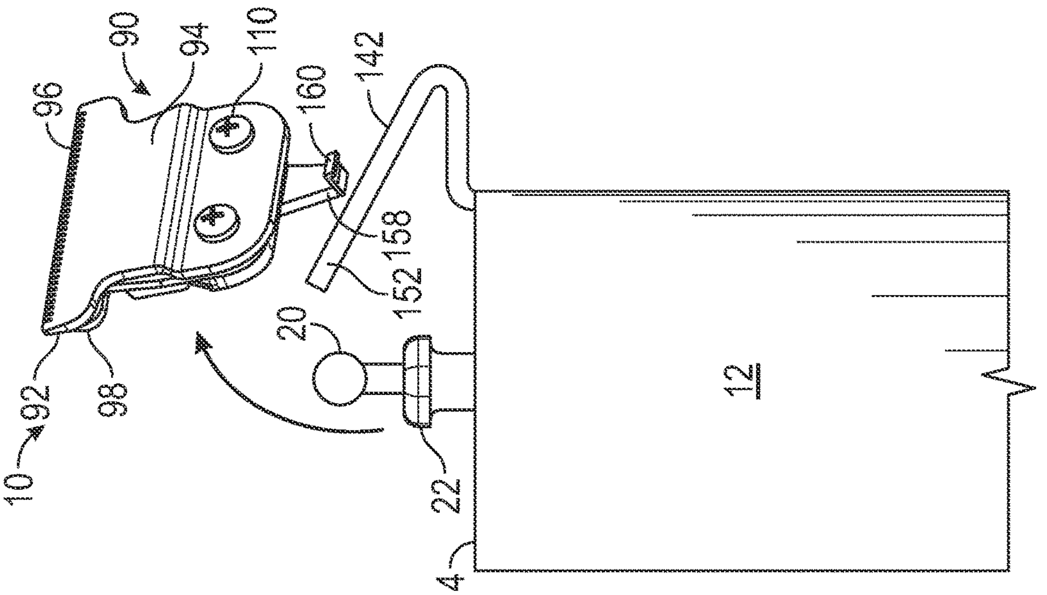
FIGS. 25-27 are sequential views of the removal of the workhead of FIG. 21 from the present hair trimmer.
Figure 26:
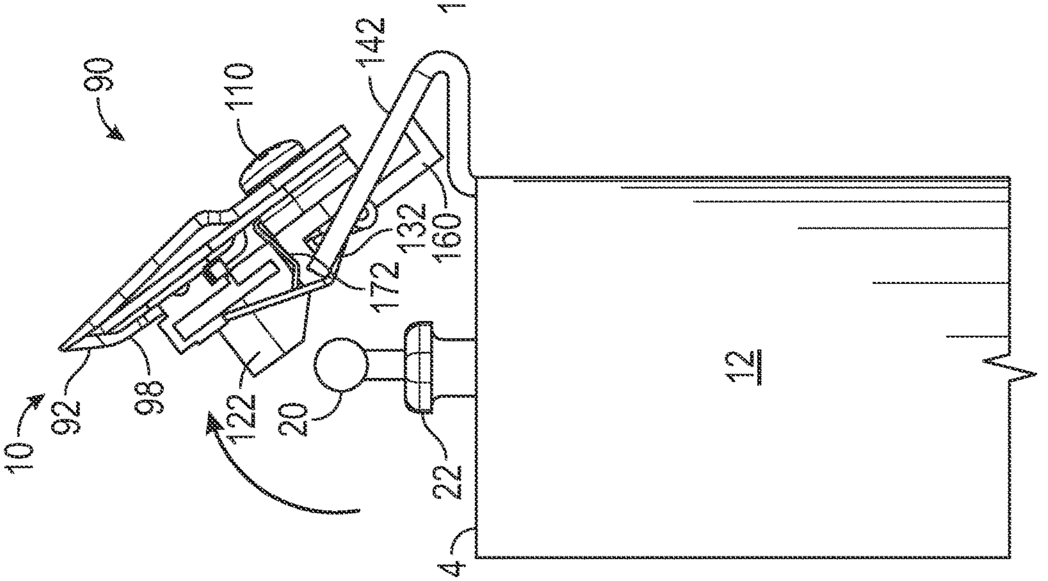
Figure 25:
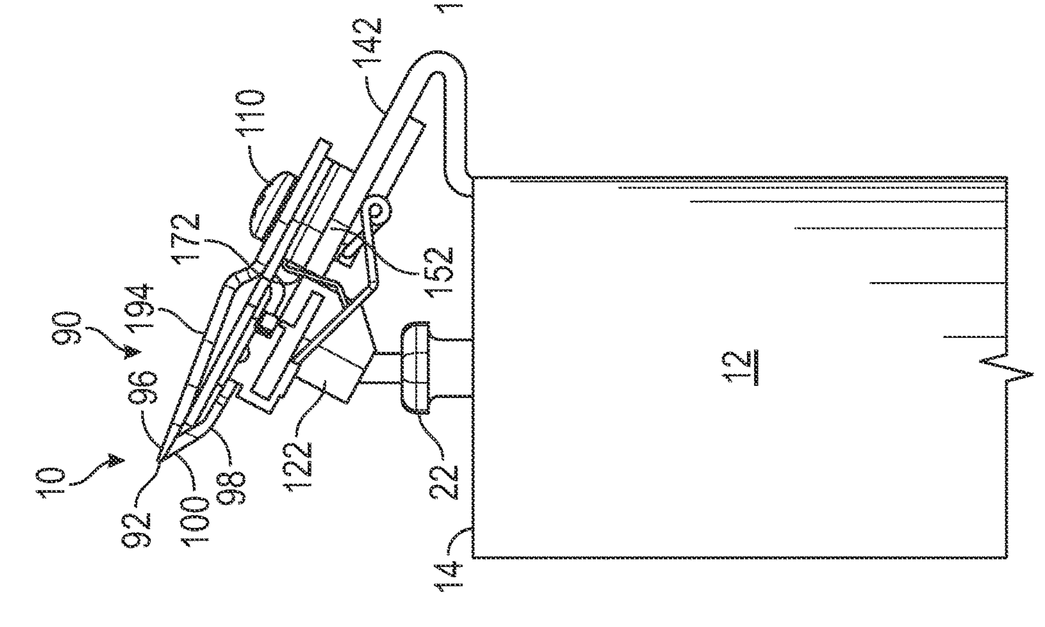

Referring now to FIGS. 25-27, the sequential operation of user-manipulated disengagement of the hair trimmer workhead 90 from the alternate spring grip support bracket 140 is shown. In FIG. 25, the workhead 90 is shown in an operational position. In FIG. 26, the user has exerted downward pressure on the workhead 90 on the end opposite the blades 94, 98, which disengages the spring force exerted by the spring tabs 172, disengages the locating lug 160 from the locating opening 156, the depending formation 162 from the recess 154 and the cam follower 120 from the eccentric cam 20. In FIG. 27, in view of the operational disengagement of the workhead 90 from the trimmer housing 12, the workhead is twisted out of position from the trimmer for storage.

Regardless of which of the support brackets 42, 78, 102 or 140 are used, it is contemplated that a single trimmer housing 12 is provided as an assembly with multiple cutter workheads, including the nose trimmer workhead 16, the dry shaver workhead 60 and the hair trimmer workhead 90. Other trimmer workheads are contemplated as are known in the art. Thus, the user is provided with a choice of workheads 16, 60, 90 which can be readily exchanged while using only a single trimmer housing 12.

Referring now to FIGS. 28-35, another feature of the present hair trimmer 10 is that it is waterproof for use while showering or bathing or rinseable for cleaning. In the preferred embodiment, this waterproofing is achieved by encasing inner workings of the trimmer within a tubular sleeve of shrink wrap film Heat is applied to the film, which then shrinks and forms around the trimmer components, sealing them from water damage thereby forming an encased drive module.

More specifically, a chassis, generally designated 180 is constructed and arranged for placement within the trimmer housing 12 and includes a motor end 182 corresponding to the drive end 14, and an opposite charge end 184. Preferably made of injection molded plastic or similar material as known in the art, the chassis 180 includes a plurality of integrally formed mounting formations 186 for retaining in place at least one of the motor 30, a rechargeable battery 190 and a circuit board 192 having an ON-OFF switch 194. A radially enlarged disk-like flange 196 is affixed to each of the ends 182, 184. The drive shaft 18 projects past the flange 196 at the motor end 182 (FIG. 31), and at least one battery charge pin 198 extends past the flange at the battery end 184. In one embodiment, the charge pins 198 are insert molded with the flange 196 to provide a rear moisture seal. An optional protective ring 200 encircles the drive shaft 18, and a similar optional protective cowl 202 surrounds the charge pins 198 (FIG. 31).

Figure 28:
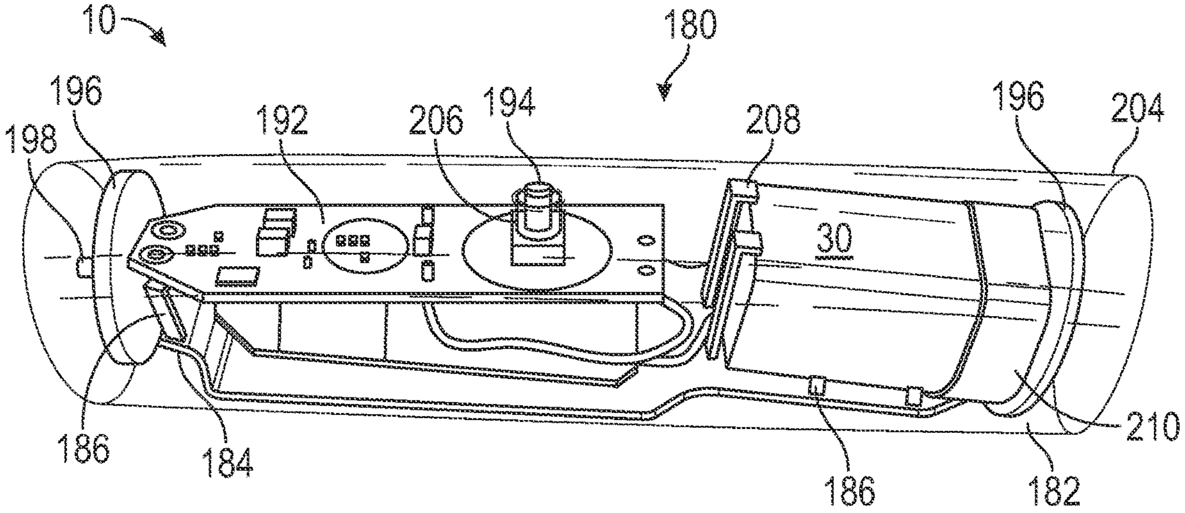
FIG. 28 is a top perspective view of a chassis of the present hair trimmer surrounded by a tubular sleeve of heat deformable plastic.
Figure 29:
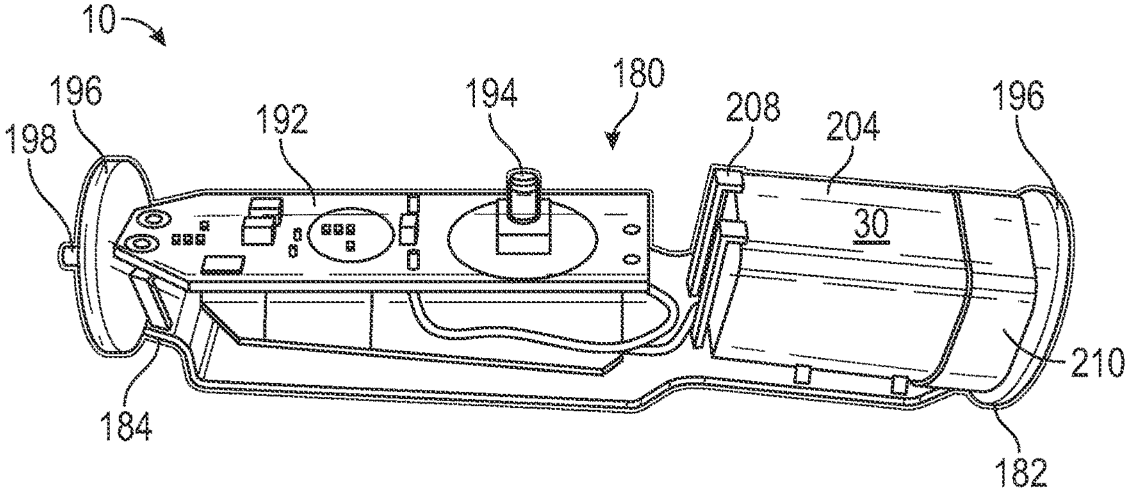
FIG. 29 is a top perspective view of the chassis of FIG. 28 after the application of heat.
Figure 30:
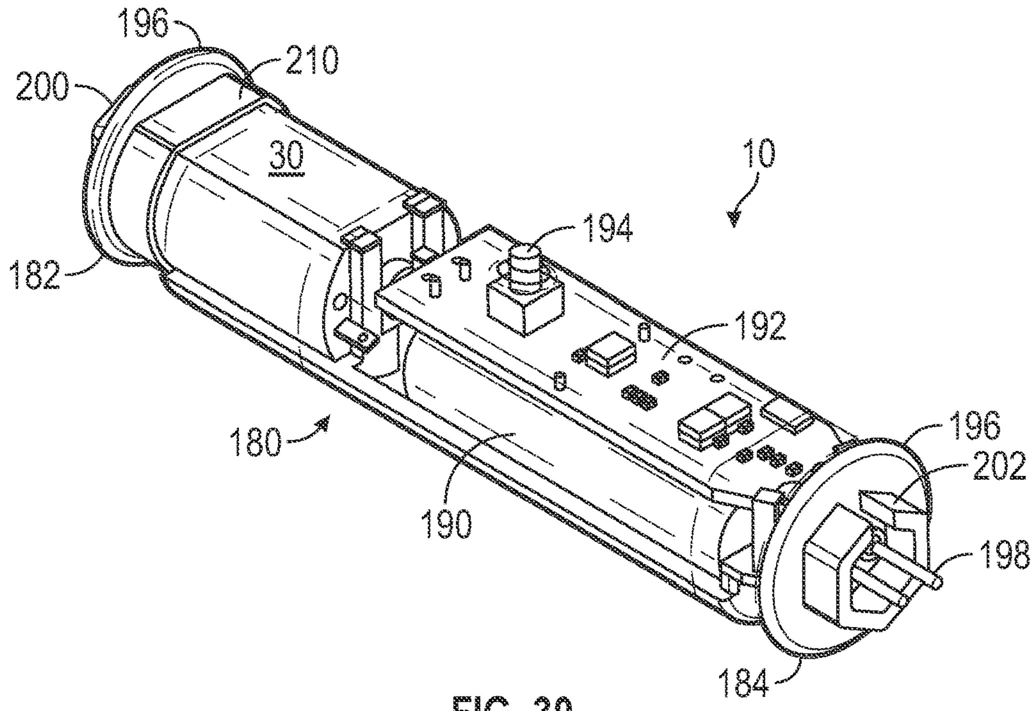
FIG. 30 is an end top perspective view of the chassis of FIG. 29.

Referring now to FIGS. 28 and 29, to achieve the desired waterproofing of the trimmer chassis 180 and associated components, a tubular sleeve of shrink wrap film 204 is inserted so as to surround the chassis. The sleeve 204 is dimensioned to have a diameter just larger than a diameter of the flanges 196. Also, the sleeve 204 has a length that extends axially past and overlaps both of the flanges 196. After suitable placement, heat is applied to the sleeve 204 as is known in the art. Conventionally, temperatures in the range of 250-350° F. are applied to cause shrinkage of the shrink wrap film, which is preferably made of plastic polymer. The heat is typically applied using a heat gun or a heat tunnel and a conveyor. As the sleeve 204 shrinks, it attaches to and seals around the flanges 196, as well as other components mounted to the chassis 180. FIG. 29 depicts the chassis 180 with the shrunken sleeve 204 encapsulating the chassis and components, forming an internal waterproof enclosure.

To protect the ON-OFF switch 194 during the shrink wrap process, it is preferred that an annular protector 206 preferably formed by a segment of flexible tubing be placed around the switch before the sleeve 204 is placed about the chassis. The protector 206 is preferably at least as tall as the switch. Then, as heat is applied, the sleeve 204 shrinks around the tubing 206 to form a flat or even profile across the switch 194.

Figure 31:
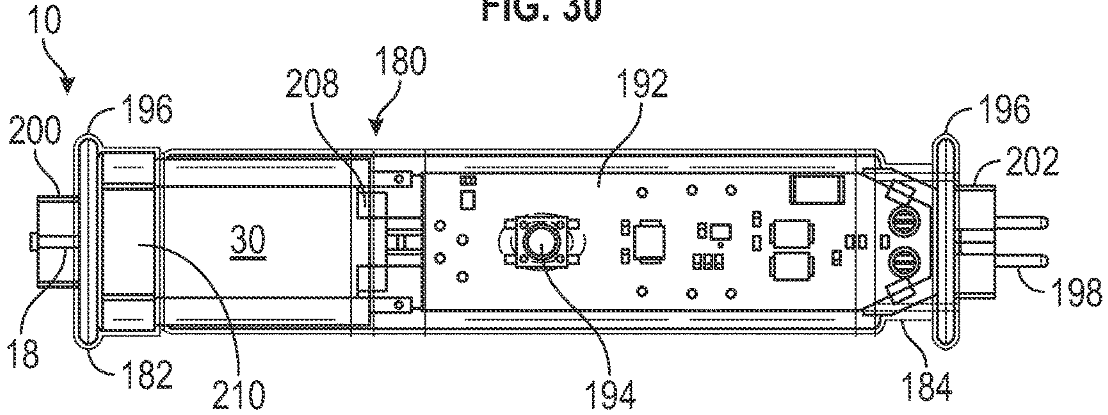
FIG. 31 is a rotated top view of the chassis of FIG. 29.
Figure 32:
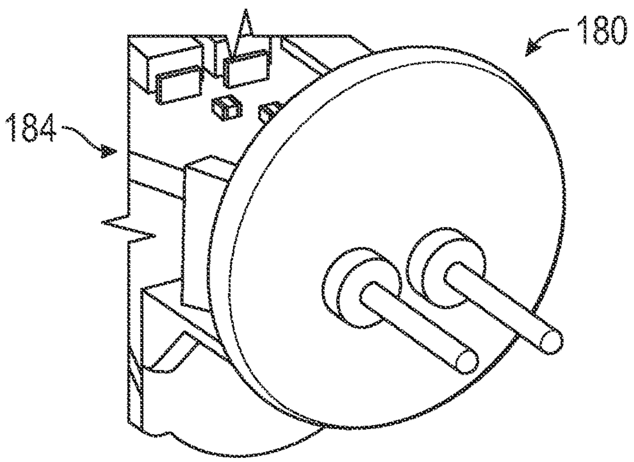
FIG. 32 is a fragmentary end view of the chassis of FIG. 29.
Figure 33:
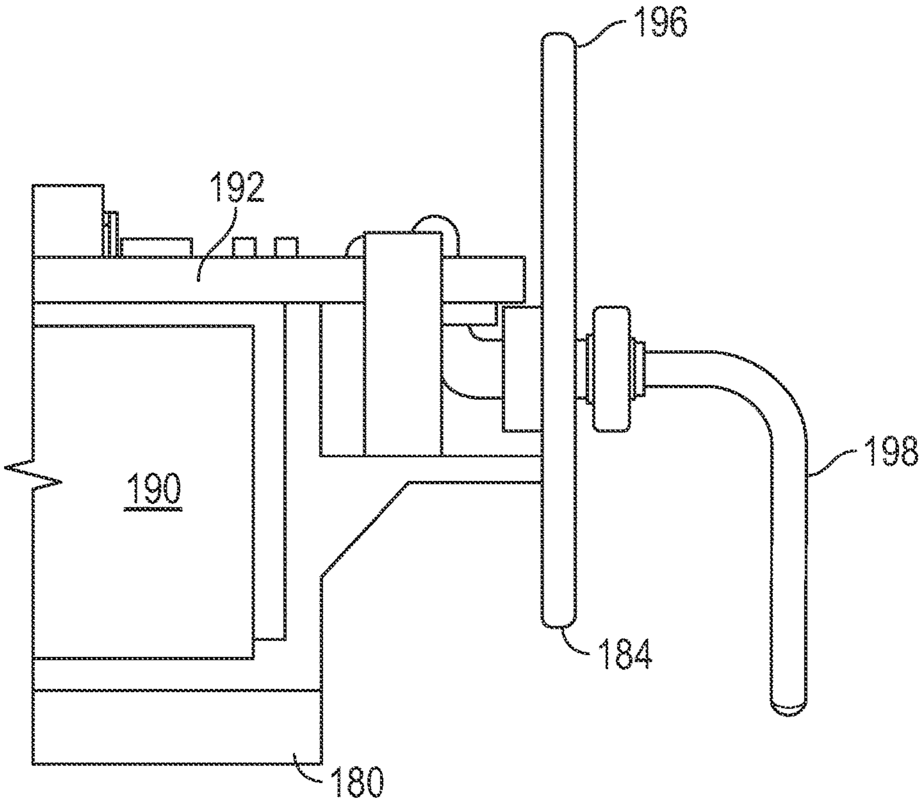
FIG. 33 is a fragmentary side elevation of an embodiment of the chassis of FIG. 29.
Figure 34:
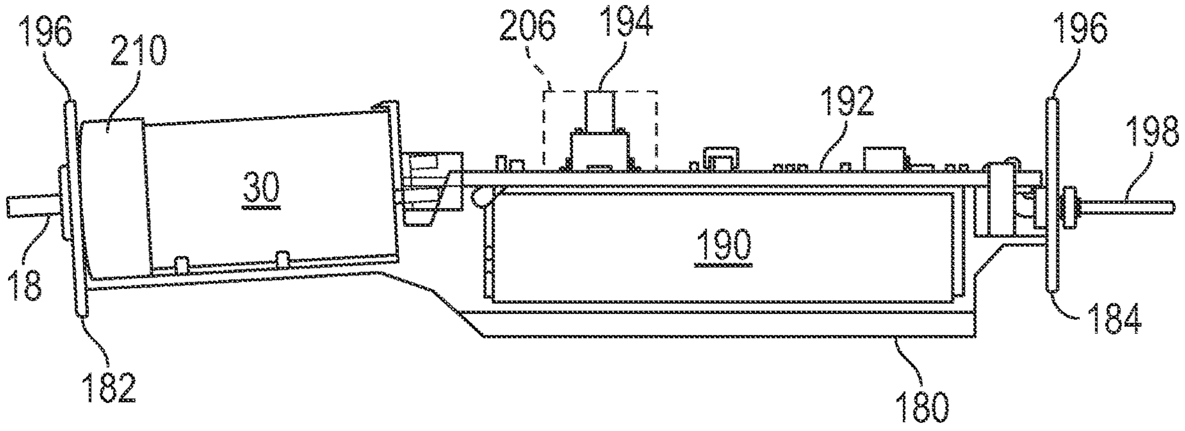
FIG. 34 is a side elevation of the chassis of FIG. 28 prior to the application of the tubular sleeve.
Figure 35:
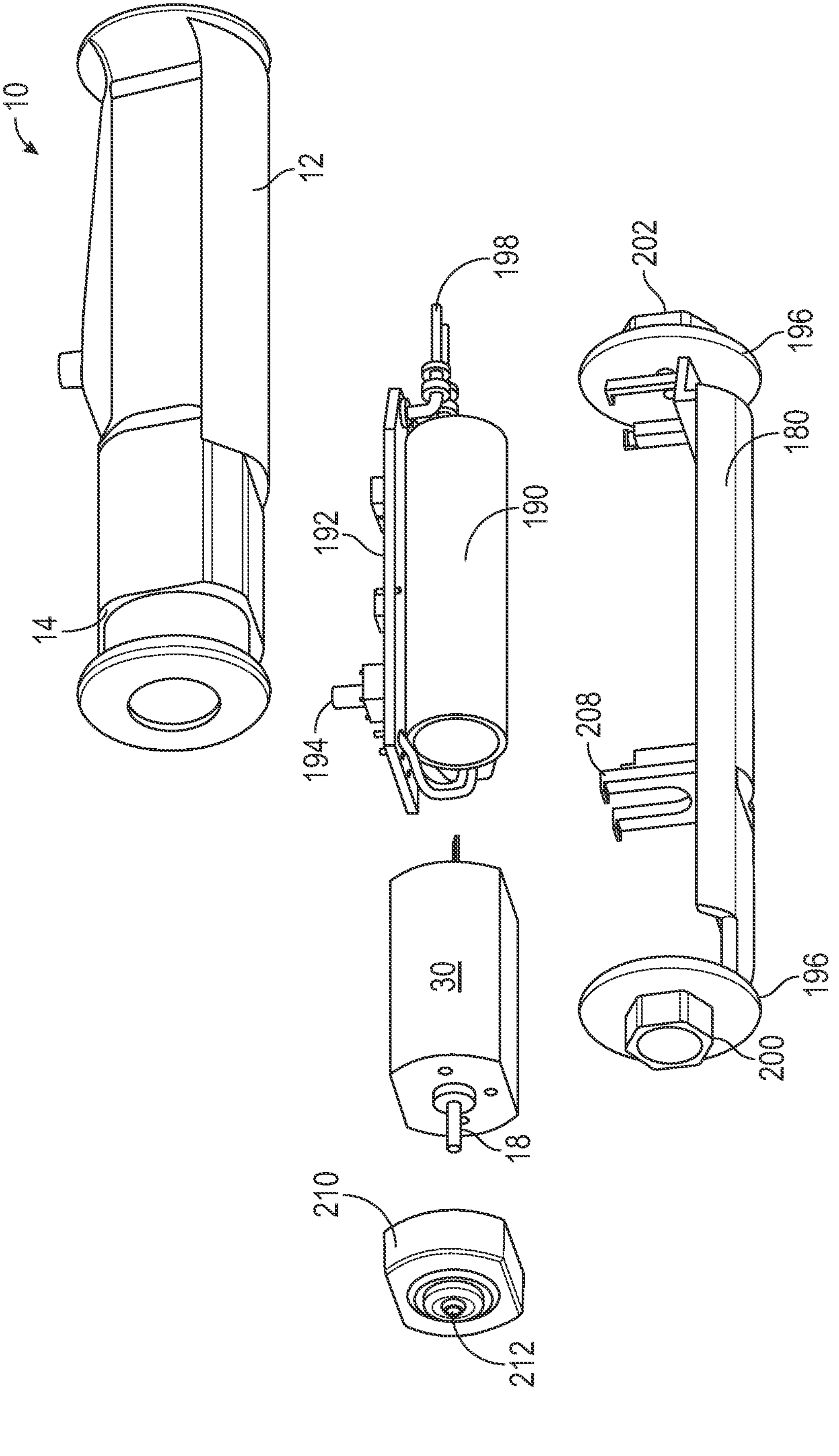
FIG. 35 is an exploded perspective view of the present hair trimmer and chassis.

Referring now to FIGS. 31, 34 and 35, the motor 30 is secured to the chassis 180 by a designated motor clamp 208 that is preferably integrally formed with the chassis. The clamp 208 is constructed and arranged for exerting a biasing force that urges the motor 30 towards the associated flange 196. Also, the motor 30 is covered at the drive shaft end by a resilient boot 210 for further protection. Water is prevented from entering the motor 30 at the driveshaft 18 through the use of a resilient, rubber-like shaft seal 212. Referring now to FIGS. 32 and 33, the charge pins 198 have one of a linear (FIG. 32) and an angled (FIG. 33) configuration.

Figure 36:
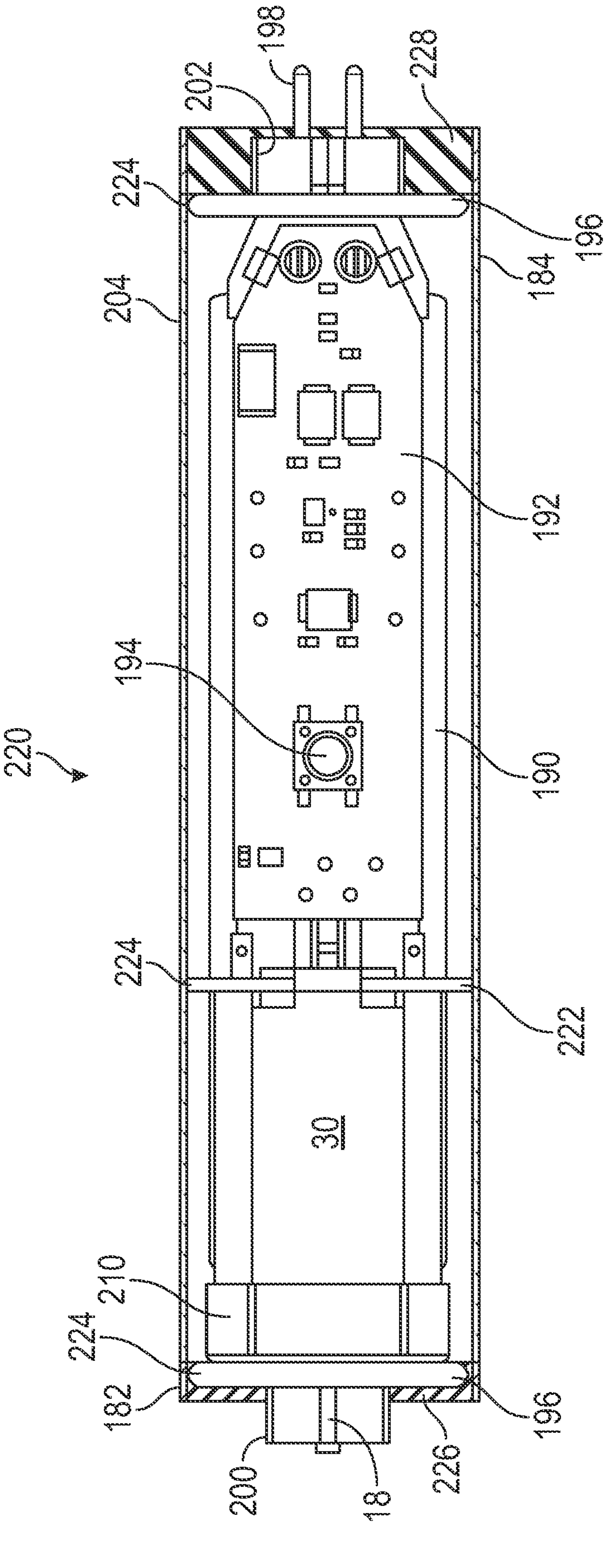
FIG. 36 is a top view of an alternate embodiment of the plastic sleeve used to waterproof a chassis of the present trimmer.

Referring now to FIG. 36, an alternate embodiment of the shrink wrap waterproof chassis 180 described above is generally designated 220. Components of the embodiment 220 which correspond to the embodiment 180 are designated with identical reference numbers. In addition to the flanges 196, an additional flange 222 is placed behind the motor 30. The sleeve 204, optionally made of heavier gauge plastic than conventional shrink wrap film, is ultrasonically welded to outer edges 224 of the flanges 196 and optionally the flange 222 around the periphery to create the waterproof seal. The sleeve 204 thus loosely engages the chassis 220 at points exclusive of the flanges 196, 222. An external rubber or polyethylene seal 226 is secured to an exterior of the motor flange 196 at the motor end 182, and a relatively thicker seal 228 of similar material is secured at the charge end 184 for sealing the charge pins 198.

While a particular embodiment of the present outliner hair trimmer with interchangeable workheads has been described herein, it will be appreciated by those skilled in the art that changes and modifications may be made thereto without departing from the invention in its broader aspects and as set forth in the following claims.

What is claimed is:

1. A hair trimmer, comprising:

a trimmer housing having a drive end;

a drive shaft projecting from said drive end;

a support bracket associated with said drive end, wherein said support bracket is removably and externally fastened to said trimmer housing;

a cutting workhead connectable to said drive shaft and being supported on said trimmer by said support bracket; and said cutting workhead being removable from operational engagement with said trimmer housing without the use of tools.

2. The hair trimmer of claim 1, wherein said support bracket has a first end configured for engaging said cutting workhead, and a second end configured for engaging an exterior surface of said trimmer housing.

3. The hair trimmer of claim 2, wherein said support bracket is releasably secured to said trimmer housing by a threaded thumbscrew.

4. The hair trimmer of claim 2, wherein said support bracket is configured for accommodating said cutting workhead using a spring clip portion on said support bracket that releasably engages a base portion of said support bracket.

5. The hair trimmer of claim 1, wherein said cutting workhead is configured as a nose trimmer, and said support bracket has a first end constructed and arranged for at least partially surrounding said cutting workhead.

6. The hair trimmer of claim 5, wherein said support bracket has a second end opposite said first end, said second end being configured for releasable attachment to said drive end using a thumbscrew.

7. The hair trimmer of claim 5, wherein said support bracket includes a spring clip portion constructed and arranged for releasably engaging a base portion fastened to said drive end.

8. The hair trimmer of claim 1, wherein said cutting workhead is configured as a dry shaver, and said support bracket has a first end fastened to said workhead.

9. The hair trimmer of claim 8, wherein said cutting workhead has a second end attachable to said drive end using a thumbscrew.

10. The hair trimmer of claim 8, wherein said support bracket includes a spring clip portion constructed and arranged for releasably engaging a base portion fastened to said drive end.

11. The hair trimmer of claim 10, wherein said spring clip portion includes two spring tabs exerting a biasing force on said base portion, and at least one lug matingly engaging an opening in said base portion.

12. The hair trimmer of claim 1, wherein said cutting workhead is configured as a hair trimmer, and said support bracket has a first end fastened to a stationary blade.

13. The hair trimmer of claim 12, wherein said support bracket has a second end attachable to said trimmer housing drive end using a thumbscrew.

14. The hair trimmer of claim 12, wherein said support bracket includes a spring clip portion constructed and arranged for releasably engaging a base portion fastened to said trimmer housing drive end.

15. The hair trimmer of claim 1, wherein said trimmer housing includes an internal waterproof enclosure formed by a tubular sleeve of plastic film.

16. The hair trimmer of claim 15, wherein said housing features an elongate chassis having radially enlarged flanges at each of two opposing ends, said flanges forming sealing attachment points for said tubular sleeve.

17. The hair trimmer of claim 16, wherein said sleeve is attached to said chassis by one of heat shrinking and welding to said flanges.

18. The hair trimmer of claim 16, further including charging pins extending from one of said flanges, said charging pins having one of a linear and an angled configuration.

19. The hair trimmer of claim 15, further including a switch secured to said housing, and an annular protector surrounding said switch and forming a guide for, and provide a flat profile for said switch as said sleeve is heated and sealingly engages portions of said trimmer.

* * * * *